United States Patent [19]
Fogarasi et al.

[11] Patent Number: 6,128,619
[45] Date of Patent: Oct. 3, 2000

[54] GENERATING AN INTERNET APPLICATION FOR ACCESSING A HIERARCHICAL DATABASE

[75] Inventors: Attila Joseph Fogarasi, Morgan Hill; Shyh-Mei Fang Ho; Wai-Yee Doris Ling, both of Cupertino; Kevin Michael McBride, Menlo Park, all of Calif.

[73] Assignee: International Business Machines Corporation, Armonk, N.Y.

[21] Appl. No.: 09/070,227

[22] Filed: Apr. 30, 1998

[51] Int. Cl.⁷ .................................................. G06F 17/00
[52] U.S. Cl. ........................ 707/102; 707/101; 707/103; 707/10
[58] Field of Search .................. 707/1–206, 4, 707/101, 102, 103, 10; 709/315, 107; 345/335; 717/2, 5

[56] References Cited

U.S. PATENT DOCUMENTS

| | | | |
|---|---|---|---|
| 5,161,225 | 11/1992 | Abraham et al. | 707/103 |
| 5,212,787 | 5/1993 | Baker et al. | 707/101 |
| 5,235,701 | 8/1993 | Ohler et al. | 707/1 |
| 5,291,583 | 3/1994 | Bapat | 717/5 |
| 5,295,256 | 3/1994 | Bapat | 717/5 |
| 5,297,279 | 3/1994 | Bannon et al. | 707/103 |
| 5,303,379 | 4/1994 | Khoyi et al. | 717/10 |
| 5,379,419 | 1/1995 | Heffernan et al. | 707/4 |
| 5,414,812 | 5/1995 | Filip et al. | 707/103 |
| 5,421,015 | 5/1995 | Khoyi et al. | 709/107 |
| 5,426,747 | 6/1995 | Weinreb et al. | 711/203 |
| 5,437,027 | 7/1995 | Bannon et al. | 707/103 |
| 5,459,860 | 10/1995 | Burnett et al. | 707/101 |
| 5,499,371 | 3/1996 | Henninger et al. | 717/2 |
| 5,542,078 | 7/1996 | Martel et al. | 707/101 |
| 5,581,756 | 12/1996 | Nakabayashi | 707/2 |
| 5,613,099 | 3/1997 | Erickson et al. | 709/315 |
| 5,627,979 | 5/1997 | Chang et al. | 345/335 |
| 5,737,597 | 4/1998 | Blackman et al. | 707/103 |
| 5,737,598 | 4/1998 | Blackman et al. | 707/103 |
| 5,764,979 | 6/1998 | Blackman et al. | 707/103 |
| 5,794,248 | 8/1998 | Blackman et al. | 707/103 |
| 5,799,313 | 8/1998 | Blackman et al. | 707/103 |
| 5,809,509 | 9/1998 | Blackman et al. | 707/103 |

OTHER PUBLICATIONS

Muckenhaupt, Kenneth J., "Preserving Current Assets With Objects on MVS White Paper," Mar. 15, 1996, at http://www.s390.ibm.com/products/wp/wrapwp.html.

"The Essential Distributed Objects Survival Guide—Chapter 8 CORBA Services: Persistence and Object Databases," at http://koh.kyungpook.ac.kr/members/gwh/ai8.html. Date unknown.

IBM Corporation. "IMS in an Object Oriented World," San Jose, California, Jul. 12, 1995, pp. 1–53.

Howe III, Jack L., "IMS/OO—Overview: Objects in IMS Are Closer Than They Appear", IBM Corporation, Overheads from presentation at SHARE '95, Feb. 23, 1995.

Howe III., Jack. L., "Objects in the IMS are Closer Than They Appear", IBM Corporation, Overheads from presentation at IBM Technical Interchange '95, May 20, 1995.

(List continued on next page.)

*Primary Examiner*—Thomas G. Black
*Assistant Examiner*—David Jung
*Attorney, Agent, or Firm*—Gates & Cooper

[57] ABSTRACT

A method, apparatus, and article of manufacture for generating an application for accessing a hierarchical database. A database description and a record layout associated with the hierarchical database are captured and associated to define a specification for the database. Class definitions are then generated from the database specification, wherein the class definitions are instantiated as objects in an objects framework that encapsulate data retrieved from the database. Display forms are also generated from the database specification, wherein the display forms are used to display the data encapsulated by the instantiated objects in the objects framework.

45 Claims, 24 Drawing Sheets

OTHER PUBLICATIONS

"Voyager/C++ Client/Server Object Management System," Secant Technologies, Inc., 1995.

Ho, Shyh–Mei, "Object Access To IMS Data," IMS OO–Web Design/Development, IBM Santa Teresa Laboratory, San Jose, California, Overheads from presentation at SHARE '97, Mar. 1997.

Wark et al., "Learning object dynamics for smooth tracking of moving contours," Electronic Letters, Mar. 16, 2000, pp. 520–521.

Xydeas et al. "Objective image fusion performance measure," Electronic Letters, Feb. 17, 2000, pp. 308–309.

Peacock et al., Reference block updating when tracking with block match algorithm, Feb. 17, 2000, pp. 309–310.

Please enter the following Retrieval Contexts:

PartRoot's Key: AN960C10

StanInfo's Key:

Display   Clear Form

FIG. 6A

Please enter the following Retrieval Contexts:

PartRoot's Key: AN960C10

StanInfo's Key: 02

Display    Clear Form

FIG. 6B

Please enter the following Retrieval Contexts:

PartRoot's Key: AN960C10

StanInfo's Key: 02

Please enter the corresponding Attribute(s) of the StanInfo object:

Proc_Code:
Inv_Code:
Plan_Num:
Make_Dept:
Make_Cost:
Comm_Code:
Make_Span:

ADD    Clear Form

FIG. 6C

| Retrieval Context(s) | | | Target Data Object Attribute(s) | | | | | |
|---|---|---|---|---|---|---|---|---|
| PartRoot's Key: | StanInfo's Key: | Proc_Code: | Inv_Code: | Plan_Num: | Make_Dept: | Make_Cost: | Comm_Code: | Make_Span: |
| AN960C10 | 74 | 74 | 2 | 3 | 12-00 | 0.00 | 14 | 63 |

DELETE
UPDATE
Clear Selection

FIG. 6D

| Retrieval Context(s) | | Target Data Object Attribute(s) | | | | | | |
|---|---|---|---|---|---|---|---|---|
| PartRoot's Key: | StanInfo's Key: | Proc_Code: | Inv_Code: | Plan_Num: | Make_Dept: | Make_Cost: | Comm_Code: | Make_Span: |
| AN960C10 | 74 | 74 | 2 | 3 | 12-00 | 0.00 | 14 | 63 |
| AN960C10 | 74 | 74 | 5 | 9 | 12-00 | 0.00 | 8 | 58 |
| AN960C10 | 72 | 72 | 3 | 4 | 12-34 | 1.80 | 11 | 97 |

DELETE   UPDATE   Clear Selection

FIG. 6E

GENERATING AN INTERNET APPLICATION FOR ACCESSING A HIERARCHICAL DATABASE

CROSS-REFERENCE TO RELATED APPLICATIONS

This application is related to the following co-pending and commonly assigned patent applications:

Utility application Ser. No. 09/070,071, entitled "AN EXECUTION PARADIGM FOR ACCESSING HIERARCHICAL DATA USING AN OBJECT FRAMEWORK," filed on same date herewith, by Kenneth R. Blackman, Shyh-Mei F. Ho, and Thomas Beavers Sander, attorney's docket number ST9-98-005;

Utility application Ser. No. 09/070,274, entitled "A GENERIC EXECUTION MODEL FOR ISOLATING APPLICATIONS FROM UNDERLYING DATABASES," filed on same date herewith, by Kenneth R. Blackman, Shyh-Mei F. Ho, and Thomas Beavers Sander, attorney's docket number ST9-98-006;

Utility application Ser. No. 09/070,528, entitled "AN OBJECT-ORIENTED PROGRAMMING MODEL FOR ACCESSING HIERARCHICAL DATABASES," filed on same date herewith, by Bach D. Doan and Shyh-Mei F. Ho, attorney's docket number ST9-98-007;

Utility application Ser. No. 09/070,273, entitled "AN INTERNET-ENABLED GENERIC APPLICATION PROGRAM FOR ACCESSING HIERARCHICAL DATA," filed on same date herewith, by Bach D. Doan and Shyh-Mei F. Ho, attorney's docket number ST9-98-027;

Provisional Application Serial No. 60/067,292, entitled "A USER INTERFACE FOR CREATING PROGRAM SPECIFICATIONS FOR ACCESSING DATABASE PERSISTENT OBJECTS," filed on Nov. 26, 1997, by Mark A. Bach, In Ha Chung, John K. Flanigan, Candace A. Garcia, Judith E. Hill, Steve T. Kuo, Theresa H. Lai, Kevin M. McBride, and H. Moncrief Rowe-Anderson, attorney's docket number ST9-97-126;

Utility application Ser. No. 09/042,238, entitled "A USER INTERFACE FOR CREATING PROGRAM SPECIFICATIONS FOR ACCESSING DATABASE PERSISTENT OBJECTS," filed on Mar. 13, 1998, by Mark A. Bach, In Ha Chung, John K. Flanigan, Candace A. Garcia, Judith E. Hill, Steve T. Kuo, Theresa H. Lai, Kevin M. McBride, and H. Moncrief Rowe-Anderson, attorney's docket number ST9-97-126, which claims the benefit under 35 U.S.C. §119(e) of Provisional Application Serial No. 60/067,292 above;

Utility application Ser. No. 08/949,638, entitled "A USER INTERFACE FOR CREATING CLASS DEFINITIONS AND IMPLEMENTATIONS FOR DATABASE PERSISTENT OBJECTS," filed on Oct. 14, 1997, by Mark Alan Bach, Shyh-Mei F. Ho, Kevin Michael McBride, H. Moncrief Rowe-Anderson and Thomas Beavers Sander, attorney's docket number ST9-97-098 now U.S. Pat. No. 5,924,101;

Utility application Ser. No. 08/775,606, entitled "IMS/WWW MAPPING SYSTEM," filed on Dec. 31, 1996, by Mark Alan Bach, In Ha Chung, Judith E. Hill, Steve T. Kuo, Theresa H. Lai, Allen G. Lee, and Richard S. Uyehara, attorney's docket number ST9-96-068;

Utility application Ser. No. 08/736,762, entitled "A FRAMEWORK FOR OBJECT-ORIENTED ACCESS TO NON-OBJECT-ORIENTED DATABASES," filed on Oct. 25, 1996, by Kenneth R. Blackman and Jack L. Howe III, attorney's docket number ST9-96-038, now U.S. Pat. No. 5,799,313;

Utility application Ser. No. 08/736,763, entitled "A METHOD FOR REPRESENTING NON-OBJECT-ORIENTED DATABASES USING A COLLECTION OF COLLECTIONS DATA MODEL," filed on Oct. 25, 1996, by Kenneth R. Blackman and Jack L. Howe III, attorney's docket number ST9-96-039, now U.S. Pat. No. 5,794,248;

Utility application Ser. No. 08/738,294, entitled "A METHOD FOR THE INCREMENTAL PRESENTATION OF NON-OBJECT-ORIENTED DATABASES USING AN OBJECT-ORIENTED QUERYABLE DATABASE COLLECTION," filed on Oct. 25, 1996, by Kenneth R. Blackman and Jack L. Howe III, attorney's docket number ST9-96-040, now U.S. Pat. No. 5,781,907;

Utility application Ser. No. 08/738,104, entitled "A QUERY SYNTAX FOR ACCESSING NON-RELATIONAL, NON-OBJECT-ORIENTED DATABASES," filed on Oct. 25, 1996, by Kenneth R. Blackman and Jack L. Howe III, attorney's docket number ST9-96-041 now U.S. Pat. No. 5,778,379;

Utility application Ser. No. 08/738,082, entitled "A QUERY PARSER FOR ACCESSING NON-RELATIONAL, NON-OBJECT-ORIENTED DATABASES," filed on Oct. 25, 1996, by Kenneth R. Blackman and Jack L. Howe III, attorney's docket number ST9-96-042, now U.S. Pat. No. 5,778,358;

Utility application Ser. No. 08/738,330, entitled "A METHOD FOR USING A DATABASE CURSOR FOR THE INCREMENTAL PRESENTATION OF QUERY RESULTS WHEN TRAVERSING IMPLIED COLLECTIONS IN NON-OBJECT-ORIENTED DATABASES," filed on Oct. 25, 1996, by Kenneth R. Blackman and Jack L. Howe III, attorney's docket number ST9-96-043, now U.S. Pat. No. 5,787,436;

Utility application Ser. No. 08/736,759, entitled "A METHOD FOR REPRESENTING DATA FROM NON-RELATIONAL, NON-OBJECT-ORIENTED DATABASES AS QUERYABLE DATABASE PERSISTENT OBJECTS," filed on Oct. 25, 1996, by Kenneth R. Blackman and Jack L. Howe III, attorney's docket number ST9-96-044, now 5,794,247;

Utility application Ser. No. 08/736,764, entitled "A METHOD FOR ENCAPSULATING DATA FROM NON-OBJECT-ORIENTED DATABASES AS DATABASE PERSISTENT OBJECTS," filed on Oct. 25, 1996, by Kenneth R. Blackman and Jack L. Howe III, attorney's docket number ST9-96-047 now U.S. Pat. No. 5,794,247;

Utility application Ser. No. 08/738,103, entitled "A METHOD FOR USING QUERYABLE PERSISTENT IDENTIFIERS TO LOCATE DATA FOR DATABASE PERSISTENT OBJECTS IN NON-OBJECT-ORIENTED DATABASES," filed on Oct. 25, 1996, by Kenneth R. Blackman and Jack L. Howe III, attorney's docket number ST9-96-048, now U.S. Pat. No. 5,765,163;

Utility application Ser. No. 08/736,983, entitled "A METHOD FOR INTERFACING QUERYABLE DATABASE PERSISTENT OBJECTS TO NON-RELATIONAL, NON-OBJECT-ORIENTED DATABASES," filed on Oct. 25, 1996, by Kenneth R.

Blackman and Jack L. Howe III, attorney's docket number ST9-96-049, now U.S. Pat. No. 5,761,671;

Utility application Ser. No. 08/736,952, entitled "A METHOD FOR MANAGING QUERYABLE DATABASE PERSISTENT OBJECTS AND QUERYABLE DATABASE COLLECTIONS IN AN OBJECT-ORIENTED ENVIRONMENT," filed on Oct. 25, 1996, by Kenneth R. Blackman and Jack L. Howe III, attorney's docket number ST9-96-051 , now U.S. Pat. No. 5,765,162;

Utility application Ser. No. 08/736,765, entitled "A METHOD FOR CATALOGING DATABASE CHARACTERISTICS AND DEFINING AND GENERATING DATABASE PERSISTENT OBJECTS," filed on Oct. 25, 1996, by Kenneth R. Blackman and Jack L. Howe III, attorney's docket number ST9-96-045;

Utility application Ser. No. 09/047,786, entitled "A METHOD FOR CATALOGING DATABASE CHARACTERISTICS AND DEFINING AND GENERATING DATABASE PERSISTENT OBJECTS," filed on Mar. 25, 1998, by Kenneth R. Blackman and Jack L. Howe III, attorney's docket number ST9-96-045Z, which is a continuation of Utility application Ser. No. 08/736,765 above;

Utility application Ser. No. 08/736,922, entitled "A METHOD FOR CAPTURING AND CATALOGING DATABASE CHARACTERISTICS TO DEFINE DATABASE PERSISTENT OBJECTS," filed on Oct. 25, 1996, by Kenneth R. Blackman and Jack L. Howe III, attorney's docket number ST9-96-050, now U.S. Pat. No. 5,809,508;

Utility application Ser. No. 08/738,102, entitled "A METHOD FOR CAPTURING AND CATALOGING SPECIFICATIONS FOR DATABASE PERSISTENT CLASSES," filed on Oct. 25, 1996, by Kenneth R. Blackman and Jack L. Howe III, attorney's docket number ST9-96-036 , now U.S. Pat. No. 5,737,598;

Utility application Ser. No. 08/738,105, entitled "A METHOD FOR USING A NON-OBJECT-ORIENTED DATABASE AS A GENERIC PERSISTENT DATABASE FOR PERSISTENT OBJECTS," filed on Oct. 25, 1996, by Kenneth R. Blackman and Jack L. Howe III, attorney's docket number ST9-96-046, now U.S. Pat. No. 5,809,509; and Utility application Ser. No. 08/736,761, entitled "A METHOD FOR CAPTURING AND CATALOGING PROGRAM CHARACTERISTICS FOR THE USAGE OF DATABASE PERSISTENT CLASSES," filed on Oct. 25, 1996, by Kenneth R. Blackman and Jack L. Howe III, attorney's docket number ST9-96-037, now U.S. Pat. No. 5,764,979; all of which applications are incorporated by reference herein.

BACKGROUND OF THE INVENTION

1. Field of the Invention

The present invention relates generally to computerized methods for accessing databases, and in particular, to a method for generating an Internet application for accessing a hierarchical database using an object-oriented framework.

2. Description of Related Art

It is well known in the art to use database management systems, such as IBM's IMS™ (Information Management System) database management system, to manage computerized databases. Indeed, IMS™ has been used for decades and remains in use today. Currently, there is a need to access such "legacy" databases using application programs specially adapted for Internet access. However, there are few tools available to assist developers.

Today, either an IMS™ DB batch or an IMS™ or CICS™ on-line transaction application program is required to access an IMS™ database. Developers either have to use existing IMS™ application programs or they have to develop new application programs and then perform a system generation (i.e., SYSGEN) to define new transactions to an IMS™ system. Because of the complexity of developing new IMS™ application programs, very few have been developed in recent years.

Therefore, there is a need in the art for technologies that use existing legacy IMS™ application programs to provide Internet access. Moreover, such technologies should minimize the need for developing new application programs.

SUMMARY OF THE INVENTION

To overcome the limitations in the prior art described above, and to overcome other limitations that will become apparent upon reading and understanding the present specification, the present invention discloses a method, apparatus, and article of manufacture for generating an Internet-enabled application for accessing a hierarchical database. A database description and a record layout associated with the hierarchical database are captured and associated to define a specification for the database. Class definitions are then generated from the database specification, wherein the class definitions are instantiated as objects in an objects framework that encapsulate data retrieved from the database. Display forms are also generated from the database specification, wherein the display forms are used to display the data encapsulated by the instantiated objects in the objects framework.

Various advantages and features of novelty, which characterize the invention, are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples of an apparatus in accordance with the invention.

BRIEF DESCRIPTION OF THE DRAWINGS

Referring now to the drawings in which like reference numbers represent corresponding parts throughout:

FIGS. 6A, 6B, 6C, 6D, and 6E illustrate examples of web browser input and output forms generated by the Class Definition Tool according to the present invention;

FIGS. 7A–7L are "snapshots" of an IMS™ Object Connector Class Wizard, also known descriptively as a "task guide", that comprises at least a portion of the graphical user interface displayed on the monitor of the client computer by the Class Definition Tool in one embodiment of the present invention.

DETAILED DESCRIPTION OF THE PREFERRED EMBODIMENT

In the following description of the preferred embodiment, reference is made to the accompanying drawings, which form a part hereof, and in which is shown by way of illustration a specific embodiment in which the invention may be practiced. It is to be understood that other embodiments may be utilized and structural changes may be made without departing from the scope of the present invention.

Overview

The present invention provides a method for generating an Internet-enabled application for accessing hierarchical databases, such as an IMS™ database, by modeling the database into an objects framework and then accessing the database via the objects framework using standard tools, such as the DL/I™ query language for the IMS™ database.

An Internet-enabled generic application program dynamically constructs a DL/I™ query string based on web browser inputs. The generic application program then loads the objects framework to instantiates IMS™ objects and dynamically constructs DL/I™ calls to access the IMS™ database based on the web browser inputs.

A class definition tool parses database files and generates class definitions for objects that encapsulate or wrapper data retrieved from the database. The class definition tool also automatically generates input forms and output pages (for example, HTML or XML forms and pages) that are displayed on web browsers that interact with the application program and objects framework.

Using the generated forms and pages, the present invention not only supports all DL/I™ operations (i.e., display, update, delete and insert) on the IMS™ database via the web browser, but also guides the user through the IMS™ database, even if the user has no prior knowledge of the complicated hierarchical structure of the database.

The generic application program and objects framework can be used in a number of different environments, such as: (1) DL/I™ batch processing and (2) on-line transactions including both IMS™ and CICS™ transactions. Moreover, the application program and objects framework can be executed in any MVS address space, including IMS™ and non-IMS™ address spaces, such as web server address spaces.

With this invention, customers can continue to access their business data in IMS™ databases using the latest Internet technology, without relying on legacy application programs and without developing new application programs. Thus, the present invention offers improved IMS™ application programming productivity by supporting IMS™ business objects and data objects, by eliminating complicated DL/I™ programming, and by supporting use of object-oriented programming tools.

Hardware Environment

Figure 1:
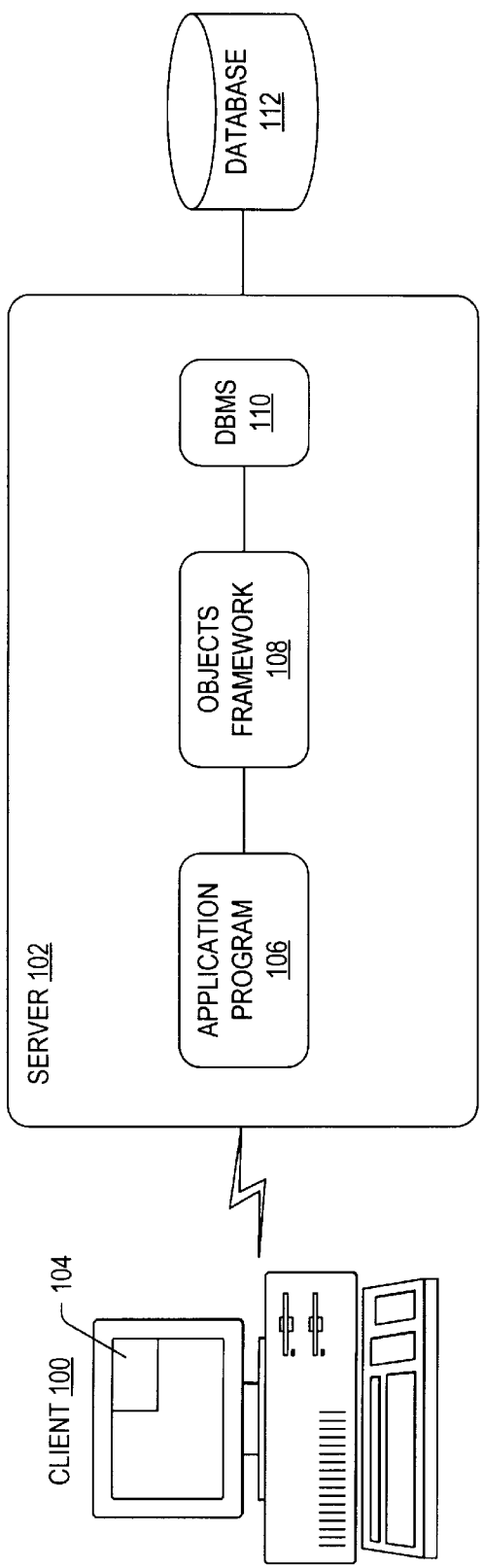
FIG. 1 is a block diagram illustrating an exemplary hardware environment used to implement the preferred embodiment of the present invention.

FIG. 1 is a block diagram illustrating an exemplary hardware environment used to implement the preferred embodiment of the invention. A client computer 100 communicates with a server computer 102. Both the client computer 100 and the server computer 102 are typically comprised of one or more processors, random access memory (RAM), read-only memory (ROM), and other components such data storage devices and data communications devices.

The client computer 100 executes one or more computer programs 104 operating under the control of an operating system. These computer programs 104 transmit requests to the server computer 102 for performing various functions and receive data from the server computer 102 in response to the requests.

The server computer 102 also operates under the control of an operating system, and executes one or more computer programs 106, 108, and 110. These computer programs 106, 108, and 110 receive requests from the client computer 100 for performing various functions and transmit data to the client computers 100 in response to the requests.

The server computer 102 manages one or more databases 112 stored on one or more data storage devices (such as a fixed or hard disk drive, a floppy disk drive, a CD-ROM drive, a tape drive, or other device). In a preferred embodiment, the database 112 is managed by the IMS™ database management system (DBMS) offered by IBM Corporation. Those skilled in the art will recognize, however, that the present invention may be applied to any database and associated database management system.

The present invention is generally implemented using five major components executed by client computers 100 and server computers 102, including a client program 104, object-oriented application program 106, objects framework 108, database management system (DBMS) 110 and database 112, wherein each of these components comprise instructions and/or data. The client program 104 provides a user interface, the object-oriented application program 106 performs application functions, the objects framework 108 materializes data retrieved from the database 112 as objects, and the database management system 110 controls access to the database 112.

Generally, these instructions and/or data 104–112 are all tangibly embodied in or retrievable from a computer-readable device, medium, or carrier, e.g., a data storage device, a data communications device, etc. Moreover, these instructions and/or data, when read, executed, and/or interpreted by the client computer 100 and/or server computer 102, causes the client computer 100 and/or server computer 102 to perform the steps necessary to implement and/or use the present invention.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that any combination of the above components, or any number of different components, including computer programs, peripherals, and other devices, may be used to implement the present invention, so long as similar functions are performed thereby.

Objects Framework Model

Figure 2:
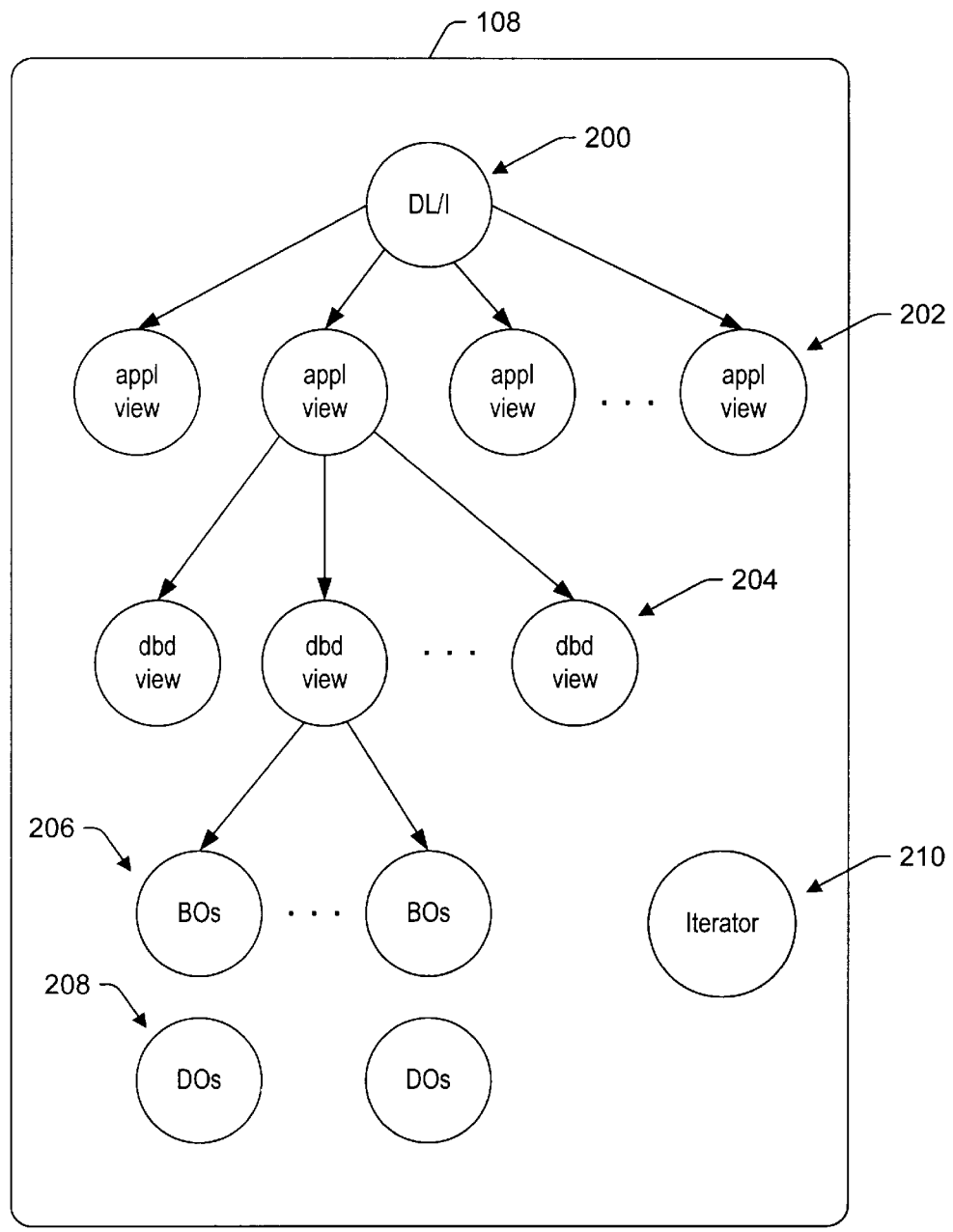
FIG. 2 is a block diagram illustrating a layered processing model used in the objects framework according to the present invention.

FIG. 2 is a block diagram illustrating a layered processing model provided by the objects framework 108 according to the present invention. The layered processing model corresponds to the application views, database definitions, and data defined and stored in an IMS™ database management system.

The objects framework 108 comprises a C++ class library that interfaces to the application program 106. The application program 106 dynamically loads previously defined objects into the objects framework 108 to access the database 112 during execution time. The objects loaded into the objects framework 108 include a DL/I™ object 200, one or more applView objects 202, one or more dbdView objects 204, one or more business objects (BOs) 206, one or more data objects (DOs) 208, and an iterator object 210.

The application program 106 first loads the objects framework 108 class library by instantiating a DL/I™ object 200, one applView object 202, and one dbdView object 204. The objects framework 108 then dynamically loads the class library for the BOs 206 and DOs 208 requested by the application program 106 to create an iterator object 210. The iterator object 210 then instantiates the BOs 206 and their corresponding DOs 208 during execution.

All the class objects, except the iterator class 210, are organized into a tree structure to represent the hierarchical structure of data retrieved from the database 112. In the preferred embodiment, the tree structure ensures that there is exactly one path through the hierarchy to each object and consequently exactly one identity, i.e., segment occurrence, for an object.

Each of the objects encapsulates a logical unit of data retrieved from the database 112 and includes member functions for manipulating the encapsulated data. The structure and member functions of these various objects are described in more detail below.

DL/I Object

In the preferred embodiment, the database 112 is an IMS™ database 112, which is an "application views database". The DL/I™ object 200 is the root of the objects framework 108, and thus is a root for a collection of application views (applView objects 202) in the IMS™ database 112. Thus, the objects framework 108 provides for multiple application views of the database 112 in a layered processing model.

applView Object

Each applView object 202 represents an "application (appl) view" of the IMS™ database 112. Each applView object 202 contains and manages a collection of dbdView objects 204.

dbdView Object

Each dbdView object 204 represents a "database description (dbd) view" associated with a given "application view" of the IMS™ database 112. Each dbdView object 204 includes information about the structure of segments in the IMS™ database 112 as well as the record layouts, including formatting information, for the records in the database 112. The dbdView objects 204 also define the hierarchy to help locate segments for the database 112. In the objects framework 108, each dbdView object 204 contains and manages a collection of data objects (DOs) 206 and business objects (BOs) 208.

Business Objects and Data Objects

The IMS™ database 112 is comprised of a collection of segment types, and each segment type contains a collection of segment occurrences. A data object (DO) 208 class represents each segment type and each segment occurrence is represented by an instance of the class, i.e., a DO 208. Thus, the DOs 208 provide a direct mapping of the data within each segment occurrence. Moreover, the object-oriented application program 106 can directly access the data of the segment occurrence by interacting with the DO 208 via the objects framework 108 to perform the necessary operations on the database 112.

In addition, a business object (BO) 206 may be instantiated with a DO 208 to provide business logic for the application program 106. In such an embodiment, the application program 106 accesses the business logic via the BO 206, which in turns invokes the methods of its corresponding DO 208 to perform the necessary operations on the database 112 to manage its essential state data. Thus, the DO 208 isolates the BO 206 from the specifics of the database 112. With the BO/DO model, customers can easily separate business logic from the physical data access logic to accommodate more diversified business needs. Furthermore, because of the nature of the separation of BO 206 and DO 208, the objects framework 108 can be easily extended to other non-hierarchical datastores, e.g. DB2™.

Iterator Object

In the objects framework 108, the application program 106 uses a DL/I™ query string to access the IMS™ database 112. After the application program 106 receives and parses the user input, it first instantiates a desired applView object 202. If the associated DL/I™ object 200 has not been instantiated yet, this also results in its instantiation as the root of the objects framework 108 and the root for the collection of application views (applView objects 202) in the IMS™ database 112. The application program 106 then provides the DL/I™ query string to an "evaluate" method of the applView object 202. The applView object 202 builds a DL/I™ segment search argument list based on the values within the DL/I™ query string.

The application program 106 then creates the iterator object 210 that is used to point to an incrementally-materialized collection of BOs 206 and DOs 208 that meet the search criteria specified in the DL/I™ query string. The "evaluate" method of the applView object 202 reads the DL/I™ query string and sets a pointer in the iterator object 210 to point to the collection of BOs 206 and DOs 208 that meet the DL/I™ segment search criteria.

A "next" method of the iterator object 210 is invoked to instantiate each BO 206 and/or DO 208 from the database 112, wherein the resulting state data of the BO 206 and DO 208 are cached in the memory of the server computer 104. Using the pointer and "next" method of the iterator object 202, the application program 106 can iterate through a collection of BOs 206 and/or DOs 208 to materialize one BO 206 and/or DO 208 after the other in the memory of the server computer 102.

Each BO 206 and DO 208 class contains both "get" and "set" methods associated for each class attribute. The application program 106 can then retrieve or update the attributes of a DO 208 by invoking these methods. Preferably, no I/O operations are performed at the invocation of these "get" and "set" methods, and all state data is changed in memory only until a commit occurs.

As described above, the BOs 206 are used by the application program 106 to perform needed business logic on the associated DOs 208. In addition, the application program 106 can perform DL/I™ operations (e.g., retrieve, update, delete and insert) using methods of the BOs 206. The BO 206 will, in turn, invoke the methods of its corresponding DO 208 to perform actual DL/I calls.

The following methods exemplify the BO 206 methods that allow the application program 106 to retrieve a DO 208 from the database 112, to update state data for the DO 208 in the database 112, to add a new instance of the DO 208 to the database 112, or to delete a DO 208 from the database 112:

RetrieveFromDS ()
UpdateToDS()
InsertToDS()
DeleteFromDS ()

In a preferred embodiment, only the above four methods will result in actual I/O operations on the database 112.

EXAMPLE GENERIC APPLICATION PROGRAM

Following is a sample object-oriented generic application program 106 according to the present invention:

```
// generic application program
main()
{
// receive input from web server, and parse the input for an
// application view, query string, and/or desired operation
handle_request(inputDataString);
// instantiate desired applView object (and DL/I object if necessary)
applView_SSM applView(applViewName);
// Dynamically build the DL/I query string based on the input
build_query_string(inputDataString);
// instantiate iterator object and pointer using applView object's
// "evaluate" method and query string
iterator* ltr=applView.evaluate(queryString);
// use "next" method to instantiate a BO and its corresponding DO
BO*pObj=ltr->next();
// use indicated methods to retrieve, update, delete, or
// insert BOs and DOs
switch(operation)
{
// Retrieve DO
    case 0: pObj->RetrieveFromDS();
        break;
    // Update DO
    case 1: pObj->UpdateToDS();
        break;
    // Delete DO
    case 2: pObj->DeleteFromDS();
        break;
    // Insert DO
    case 3: DO*pObj=ltr->newObject();
        pObj->InsertToDS();
        break;
}
// generate reply
handle_reply(DO);
}
```

Following is a example DL/I™ query string that could be used by the object-oriented generic application program 106 to retrieve DOs 208 from the database 112:

SELECT doClassNameC
FROM databaseViewName
WHERE doClassNameA.keyname relop keyvalue,
    doClassNameB.keyname relop keyvalue,
    doClassNameC.keyname relop keyvalue where "relop" is a relational operator, such as:

EQ or=or=
GT or>or>
LT or<or<
GE or>=or=>
LE or<=or=<
NE or!=or=!
AND or & or*
OR or| or+

LOGIC OF THE APPLICATION PROGRAM

Figure 3:
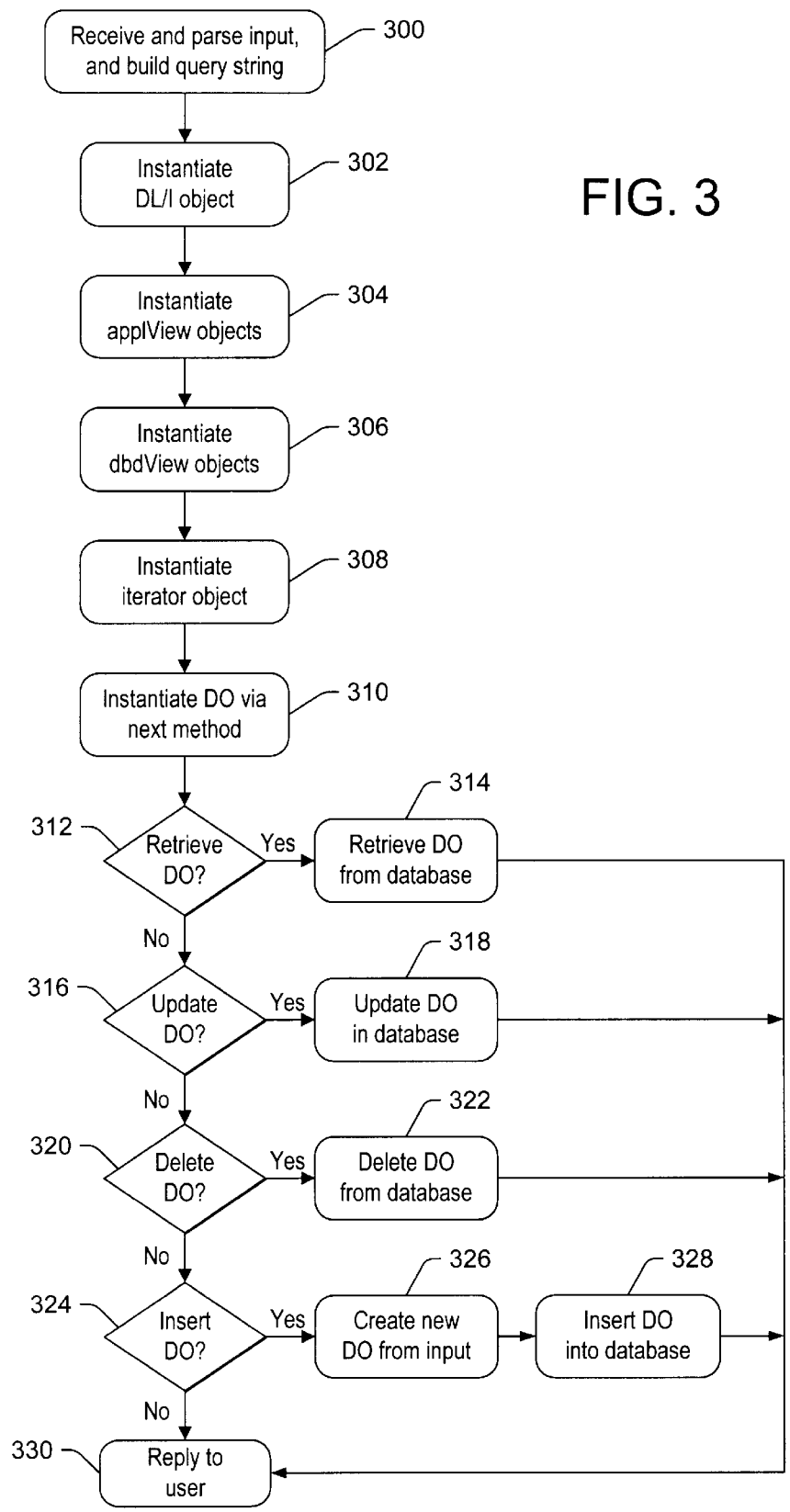
FIG. 3 is a flowchart illustrating the steps performed by the application program and objects framework according to the present invention.

FIG. 3 is a flowchart illustrating the steps performed by the application program 106 and objects framework 108 according to the present invention.

Block 300 represents the application program 106 receiving and parsing user input received from the web browser via a web server, and dynamically constructing a DL/I™ query string based on the user input. Usually, the input is in an HTTP format, although other protocols may be used as well. For example, a web server could parse the input itself and then provide the parsed input to the application program 106 via a Common Gateway Interface (CGI), Netscape Server API (NSAPI), Internet Connection Server API (ICAPI), or other protocol.

Block 302 represents the DL/I™ object 200 of the objects framework 108 being instantiated in the memory of the server computer 102. Usually, this occurs either when the objects framework 108 is loaded or when the application program 106 first requests an applView object 202.

Block 304 represents the application program 106 instantiating the requested applView object 202 in the memory of the server computer 102.

Block 306 represents the dbdView objects 204 of the objects framework 108 being instantiated in the memory of the server computer 102. Usually, this occurs either when the objects framework 108 is loaded or when the application program 106 first requests an applView object 202.

Block 308 represents the application program 106 instantiating the iterator object 210 in the memory of the server computer 102 and then setting its object pointer by invoking the "evaluate" method with a DL/I™ query string.

Block 310 represents the application program 106 setting the pointer of the iterator object 210 in the memory of the server computer 102.

Block 312 represents the application program 106 invoking the "next" member function or method of the iterator object 210 to instantiate/materialize a DO 208 and/or BO 206 in the memory of the server computer 102.

Block 314 is a decision block that represents the application program 106 determining whether the requested operation is a request to retrieve a DO 208. If so, control transfers to Block 316; otherwise, control transfers to Block 318. Block 316 represents the application program 106 retrieving data from the database 112 via a method of the DO 208. Thereafter, control transfers to Block 332.

Block 318 is a decision block that represents the application program 106 determining whether the requested operation is a request to update a DO 208. If so, control transfers to Block 320; otherwise, control transfers to Block 322. Block 320 represents the application program 106 updating data in the database 112 via a method of the DO 208. Thereafter, control transfers to Block 332.

Block 322 is a decision block that represents the application program 106 determining whether the requested operation is a request to delete a DO 208. If so, control transfers to Block 324; otherwise, control transfers to Block 326. Block 324 represents the application program 106 deleting data from the database 112 via a method of the DO 208. Thereafter, control transfers to Block 332.

Block 326 is a decision block that represents the application program 106 determining whether the requested operation is a request to insert a DO 208. If so, control transfers to Block 328; otherwise, control transfers to Block 332. Block 328 represents the application program 106 creating or instantiating a new DO 208 and Block 330 represents the application program 108 inserting data into the database 112 via a method of the DO 208. Thereafter, control transfers to Block 332.

Block 332 represents the application program 108 replying to the user at the web browser via the web server. Usually, the output is in an HTML or XML format, although other formats or protocols may be used as well. For example, the application program 106 could provide a web server with the output for formatting by the web server itself.

Class Definition Tool (CDT)

Figure 4:
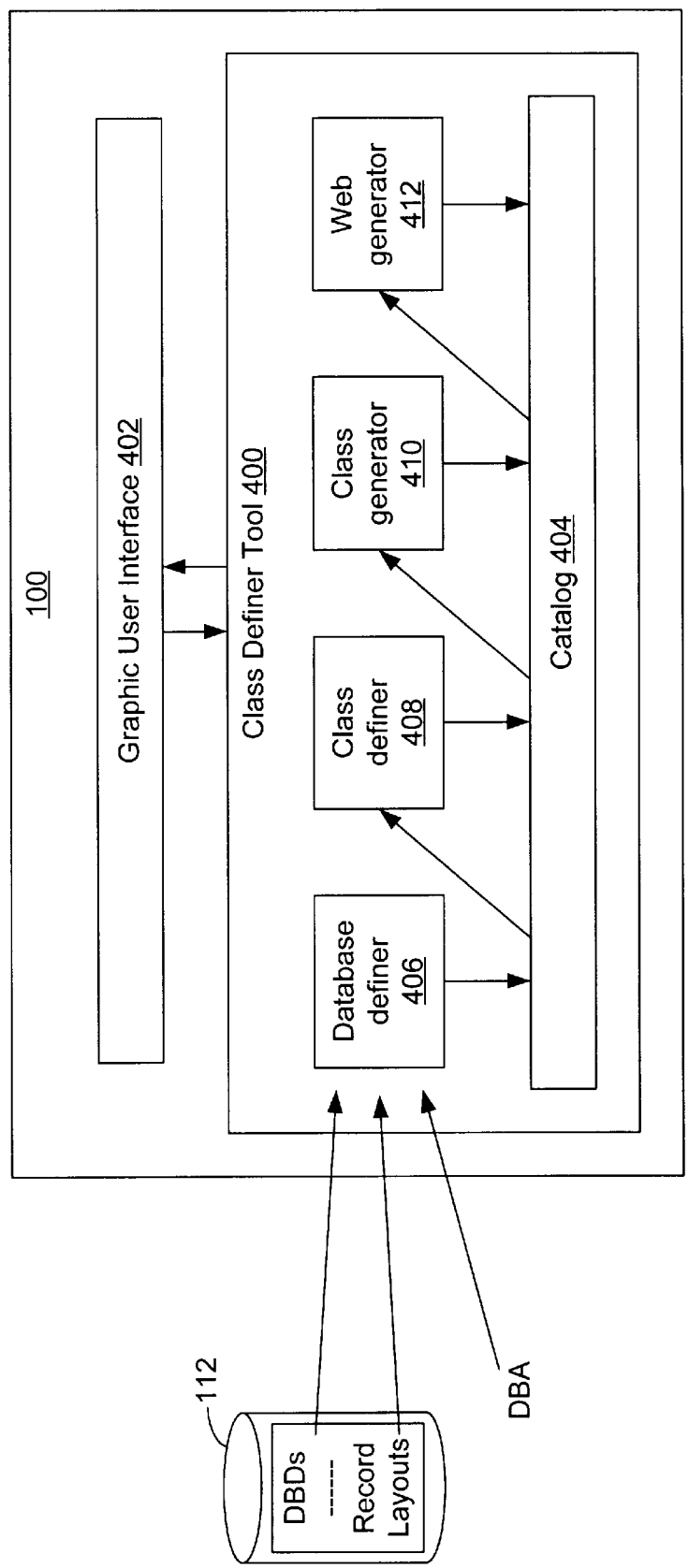
FIG. 4 is a block diagram illustrating the structure of a Class Definition Tool according to the present invention.
Figure 5:
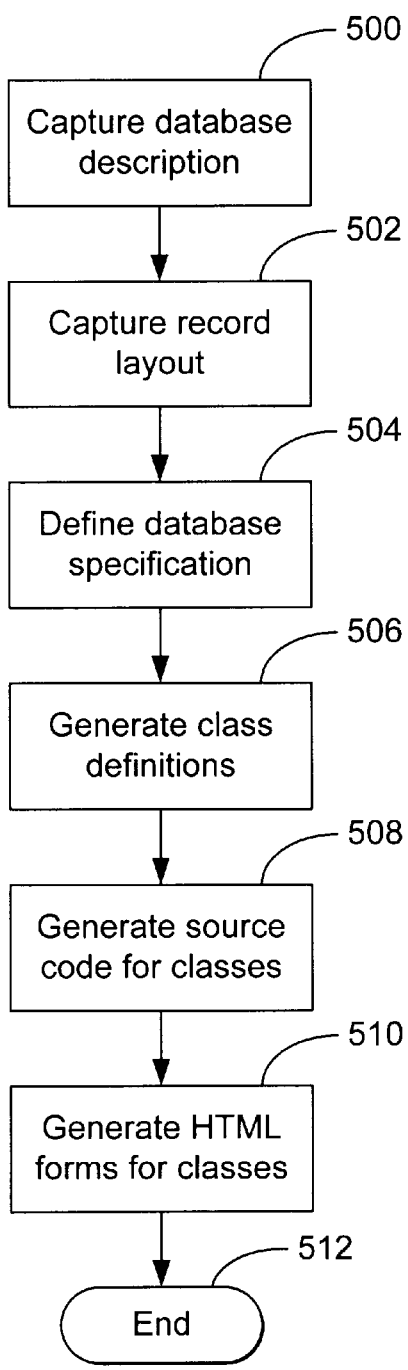
FIG. 5 is a flowchart illustrating the logic performed by the Class Definition Tool according to the present invention.

FIG. 4 is a block diagram illustrating the structure of a Class Definition Tool (CDT) 400 according to the present invention, and FIG. 5 is a flowchart illustrating the logic performed by the CDT 400 according to the present invention. The CDT 400 executes under the control of the operating system on the client computer 100, interacts with an operator via a Graphical User Interface (GUI) 402, and stores information in a catalog 404.

To minimize the need for writing non-object-oriented code to access the database 112, the object classes and methods used in the objects framework 108 are generated by the CDT 400. Generally, these classes and methods are typically generated as C++ source code, although other programming languages could be used as well. Using the object framework 108 as its runtime component, the application program 106 instantiates objects for these classes and directs the retrieval of data from the database 112 into the instantiated objects.

A database definer function 406 of the CDT 400 captures information from a database description (500) and the record layout for the database 112 (502), and associates them to one another to define a database specification (504), which is subsequently stored in the catalog 404.

The database descriptions and record layouts accessed by the CDT 400 are typically located on the server computer 102 and downloaded to the client computer 100. The database description includes information about the structure of the segments in the database 112 and the record layouts include formatting information for the records in the database 112.

Generally, the database definer function 406 can either be done automatically by the CDT 400 or in response to commands from a Database Administrator (DBA). The resulting database specification contains the relevant information extracted from the database description and the record layout, and links the database description and record layout together. The database definer function 406 may further perform an augment function that captures additional information to assist in defining the database specification.

A class definer function 408 of the CDT 400 uses the database specification in the catalog 404 and operator input to generate class definitions for the various objects (506), which are then stored in the catalog 404. The class definer function 408 may further perform an augment function that captures additional information to assist in generating the class definitions and to constrain the use of the resulting objects.

A class generator function 410 of the CDT 400 uses the class definitions to generate source code (508), which includes both class and method implementations. The source code generated by the CDT 400 is compiled, linked, and made available in executable form at run-time as the objects framework 108 on the server computer 102.

A web generator function 412 of the CDT 400 also uses the database specification in the catalog 404 and operator input to generate input and output forms (510) for display to the web browser. Using the forms, a web browser can interface to the Internet-enabled generic application program 106 to retrieve, update, delete and add data to and from the IMS™ databases. Input and Output Forms FIGS. 6A, 6B, 6C, 6D, and 6E illustrate examples of input and output forms generated by the CDT 400 according to the present invention. In a preferred embodiment, these forms are in an HTML or XML format, but those skilled in the art will recognize that other formats or protocols may be used as well.

In the present invention, a web browser user, without knowing the DL/I™ hierarchical structure of the IMS™ database 112, can use the generated input forms and resultant output forms to traverse through the IMS™ database 112 to perform desired operations.

The input form is used to retrieve and display all the segment field data. It can also be used to retrieve the data segment key value, which can be filled in the retrieval context of a different input form to display another data object (segment occurrence). The input form can also help the user to retrieve existing data from the database, and the resultant output forms are then used to modify or delete data values. In addition, the input form provides an insertion capability to allow new data to be added to a database.

The CDT 400 generates two input forms for each generated data object class. Both input forms include a hidden target data object class name and all retrieval contexts. Based on the generated data object class name on the form, the target data object class will be loaded in memory during execution time without requiring the web browser user to know the class name. The "retrieval contexts" denote all higher level segments' keynames in the hierarchical search path, including the target segment's keyname of the input forms is for display purpose and it includes a "display" action button. The other input form is for adding a new data object (i.e., a new segment occurrence) to the IMS™ database, and the form also contains all the attribute names of the target data object, and an "add" action button.

FIGS. 6A and 6B illustrate example input forms generated by the CDT 400 for displaying data objects. The retrieval contexts are optional input fields for the input form. If the web browser user does not provide input for any one of the retrieval contexts, a non-qualified search is performed for data objects after the web browser user selects the "Display" button; otherwise, a qualified search is performed. After retrieving the results, the application program 106 combines the retrieved data from a collection of data objects that meet the criteria with an output form for display to the web browser user. Using these mechanisms, the web browser user can browse the IMS™ database 112 without knowing any of the complex internal structures of the database 112.

FIG. 6C illustrates another example of an input form for inserting a new data object into the database 112. The retrieval contexts specified on the form are required inputs, but the attributes of the target data object are optional fields for insertion into the database 112.

FIGS. 6D and 6E illustrate examples of output forms according to the present invention. A skeleton output form is generated by the CDT 400 containing all the fields associated with a specific data object. The application program 106 dynamically builds the output form using the skeleton output form and the results from database 112 based on the actual input request. In FIG. 6D, the output form displays fields associated with a single retrieved data object; in FIG. 6E, the output form displays fields associated with three retrieved data objects.

After reviewing the results in an output form, the web browser user can choose to delete or update one or more of the data objects indicated by the different rows displayed on the output forms. The user first selects the desired entries, indicated by the circular selection indicators to the left of the rows in both FIGS. 6D and 6E, and then selects either the "Delete" or "Update" action buttons to delete or update the selected entries. FIG. 6D shows a single entry or row selection, while FIG. 6E shows a multiple entry or row selection. However, only one action button can be selected at a time for all selected entries. Note that, when either the delete or update action button is selected, the original resultant output form then serves as an input form.

Operation of the IMS™ Object Connector Class Wizard

FIGS. 7A–7L are "snapshots" of an IMS™ Object Connector Class Wizard, also known descriptively as a "task guide", that comprises at least a portion of the GUI 402 displayed on the monitor of the client computer 100 by the CDT 400 in one embodiment of the present invention. These snapshots illustrate an exemplary sequence of events during the operation of the IMS™ Object Connector Class Wizard 402.

The IMS™ Object Connector Class Wizard 402 of the present invention provides an improved GUI for the CDT 400. The IMS™ Object Connector Class Wizard 402 simplifies the creation and/or use of the Catalog 404. As a result, the IMS™ Object Connector Class Wizard 402 improves application programmer productivity.

The IMS™ Object Connector Class Wizard 402 is displayed whenever the CDT 400 is executed. The CDT 400 displays an initial page for the IMS™ Object Connector Class Wizard 402, as shown in FIG. 7A.

Figure 7A:
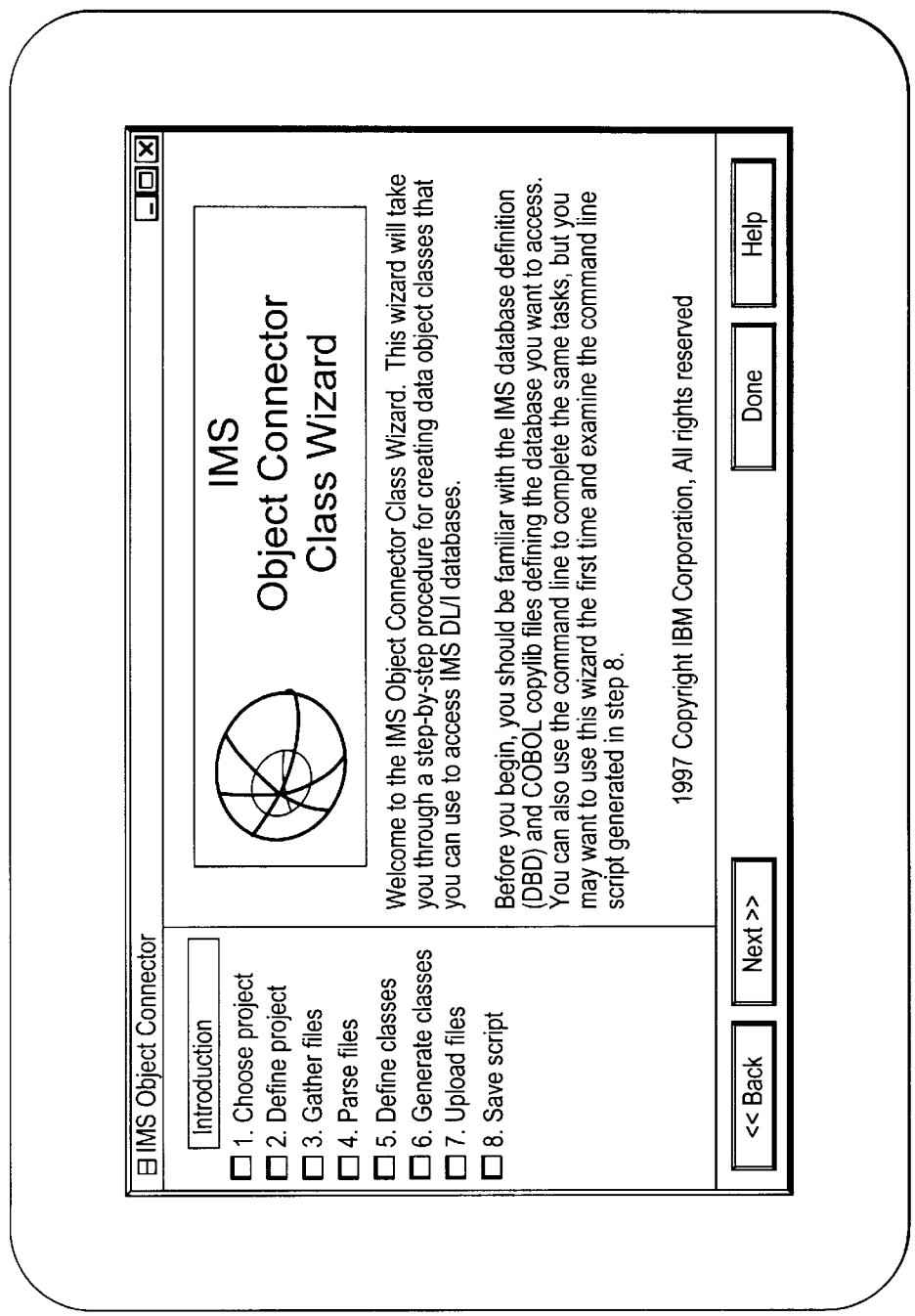

The initial page of FIG. 7A is an introduction page for the IMS™ Object Connector Class Wizard 402. This page is the beginning of the a step-by-step procedure for creating the catalog 404. Along the left side of the page as checkboxes, wherein the checkboxes are "checked" as each step is completed. Prior to beginning the steps, the operator should be familiar with the IMS™ database definition (DBD) files and COBOL copylib files defining the targeted IMS™ database 112.

The page includes four buttons, including the Back, Next, Done, and Help buttons, which perform the following functions: (1) return to the previous step by selecting the Back button; (2) proceed to the next step by selecting the Next button; (3) terminate the Wizard by selecting the Done button; and (4) display "Help" information by selecting the Help button.

Figure 7B:
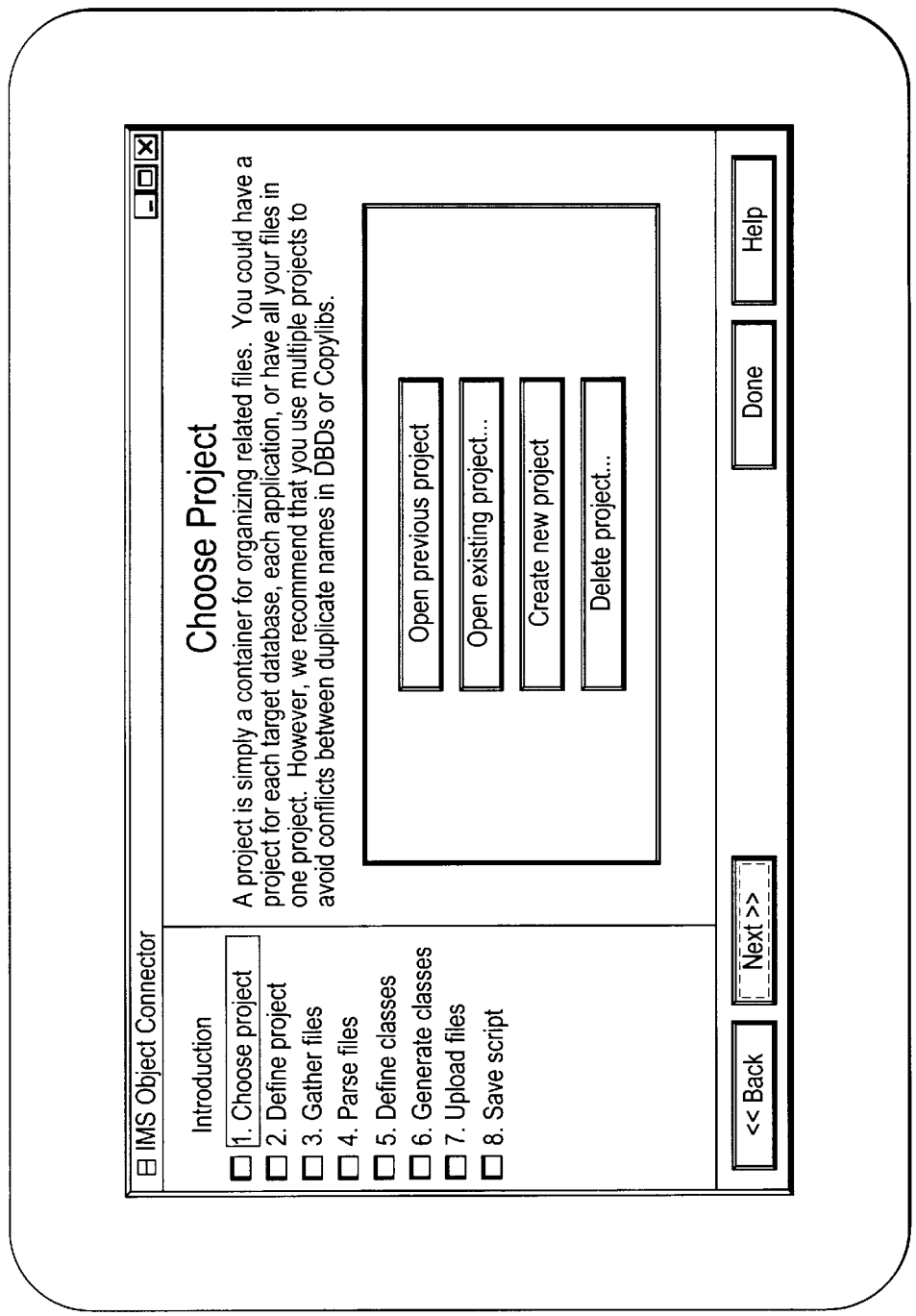

After selecting the Next button, the "Choose Project" page of FIG. 7B is displayed on the monitor of the client computer 100. A project is a folder or container within the catalog 404 for organizing related files. The user could have a project for each target database, each application, or one project for all files. Generally, the user should use multiple projects to avoid conflicts between duplicate names in the DBDs or COBOL copylibs.

The page includes eight buttons, including the Open previous project, Open existing project, Create new project, Delete project, Back, Next, Done, and Help buttons, which perform the following functions: (1) open a previous project; (2) open an existing project; (3) create a new project; (4) delete a project; (5) return to the previous step by selecting the Back button; (6) proceed to the next step by selecting the Next button; (6) terminate the Wizard by selecting the Done button; and (8) display "Help" information by selecting the Help button.

Figure 7C:
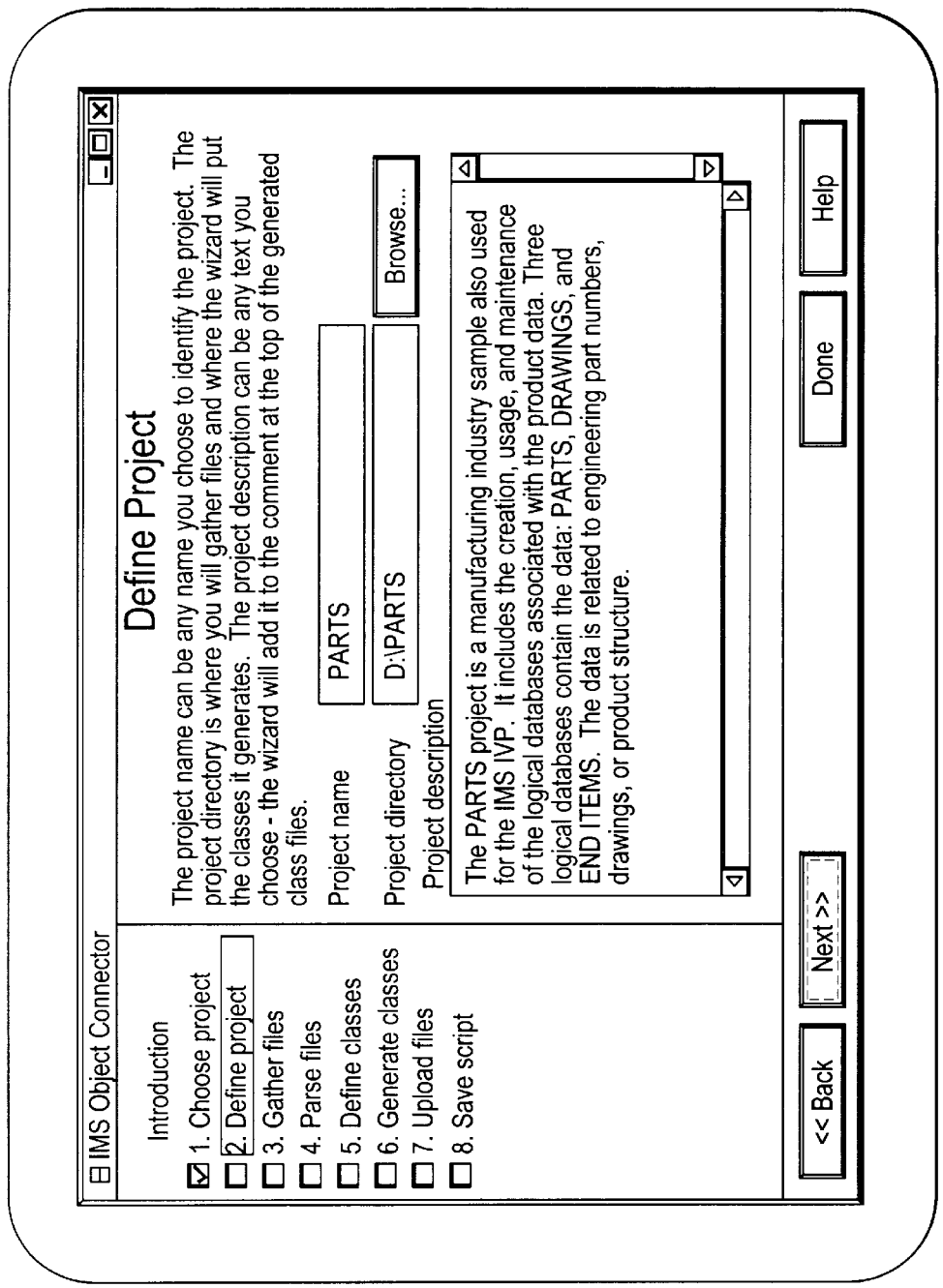

After selecting the Next button, the "Define Project" page of FIG. 7C is displayed on the monitor of the client computer 100. This page is used by the user to define the project name, project directory, and project description. The project name is any name used to identify the project; the project directory is a subdirectory where the files for the project are gathered; and the project description is any text chosen by the user, wherein the text is added to the top of the generated class source code.

The page includes three fields for specifying the project name, project directory, and project description, and four buttons, including the Back, Next, Done, and Help buttons, which perform the following functions: (1) return to the previous step by selecting the Back button; (2) proceed to the next step by selecting the Next button; (3) terminate the Wizard 402 by selecting the Done button; and (4) display "Help" information by selecting the Help button.

Figure 7D:
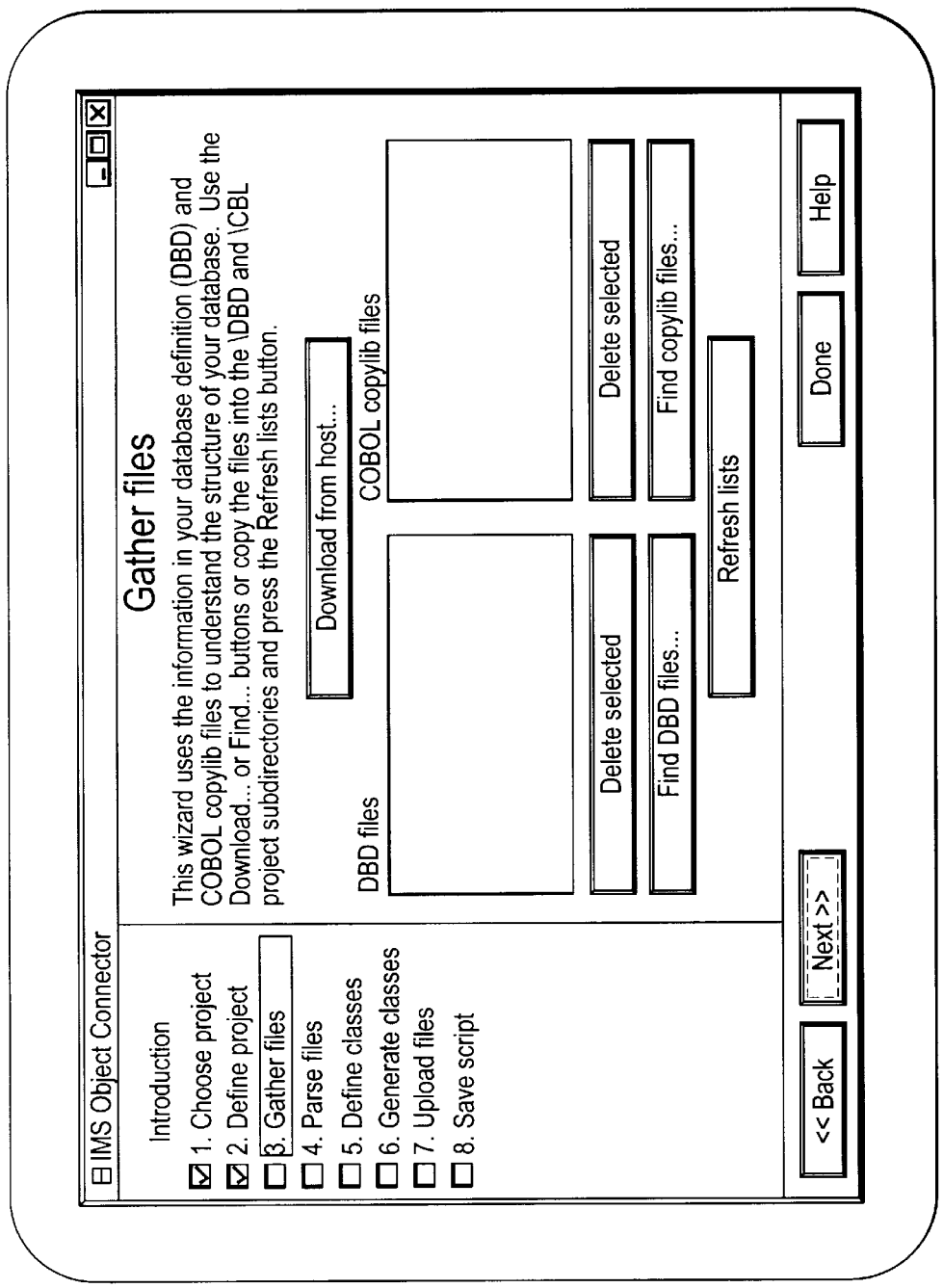

After selecting the Next button, the "Gather Files" page of FIG. 7D is displayed on the monitor of the client computer 100. This page provides the user interface for the database definer function 404 and is used by the user to specify the DBD files and COBOL copylib files to be used by the CDT 400 and stored in the catalog 404.

The page includes two list boxes for the DBD files and COBOL copylib files, respectively, and ten buttons, including the Download from host, Deleted selected (DBD files), Find DBD files, Delete selected (COBOL Copylib files), Find copylib files, Refresh lists, Back, Next, Done, and Help buttons, which perform the following functions: (1) download files from the server 102; (2) deleted the selected DBD files from the list above the button; (3) find DBD files; (4) delete selected COBOL Copylib files from the list above the button; (5) find copylib files; (6) refresh both the DBD file list and COBOL copylib file list; (7) return to the previous step by selecting the Back button; (8) proceed to the next step by selecting the Next button; (9) terminate the Wizard by selecting the Done button; and (10) display "Help" information by selecting the Help button.

Figure 7E:
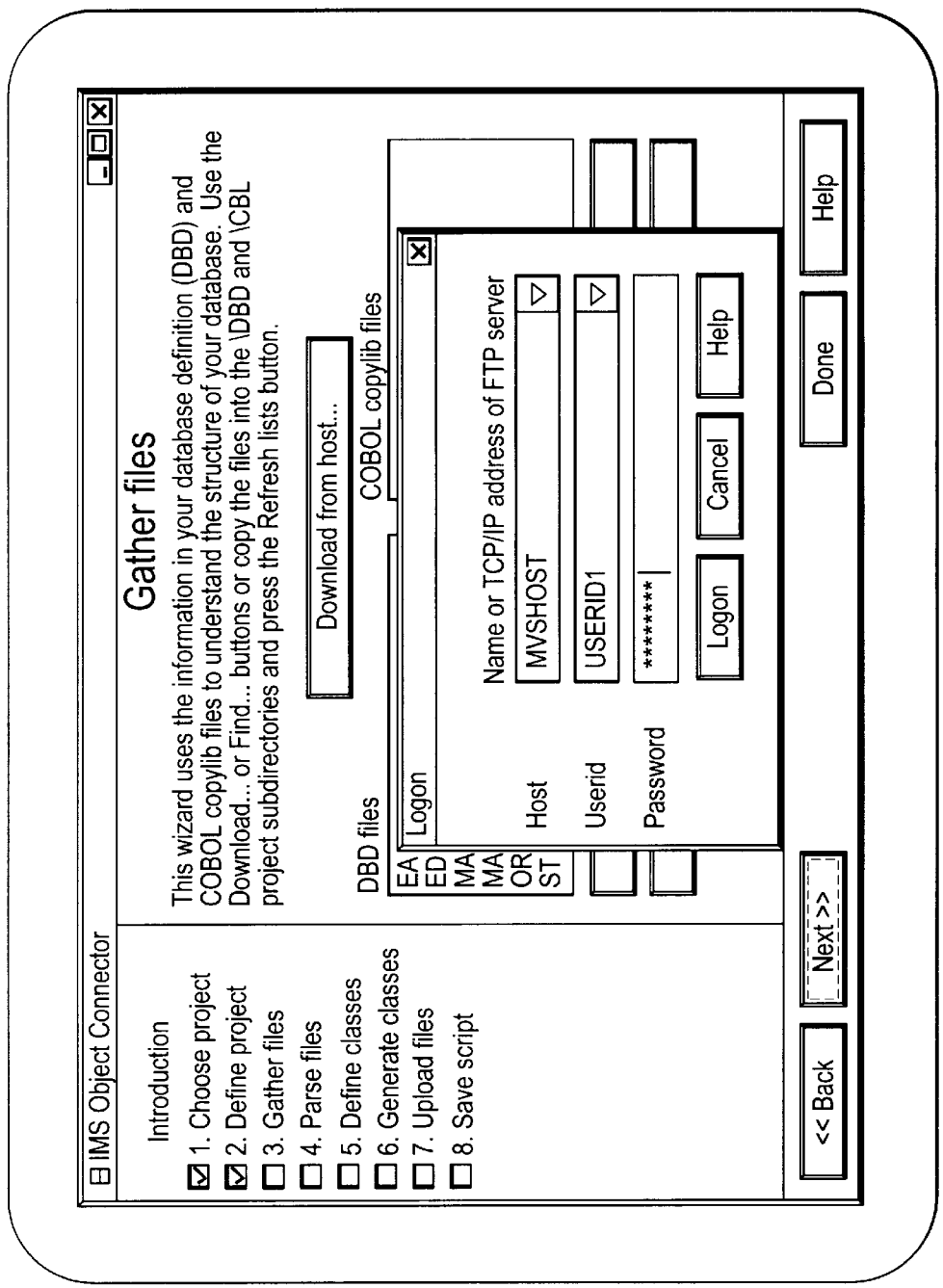

After selecting the Download from host button, the Logon page of FIG. 7E is displayed on the monitor of the client computer 100. This page also provides the user interface for the data definer function 404 and is used by the user to connect the server 102 for downloading the DBD files and COBOL copylib files to be stored in the catalog 404 by the CDT 400.

Figure 7F:
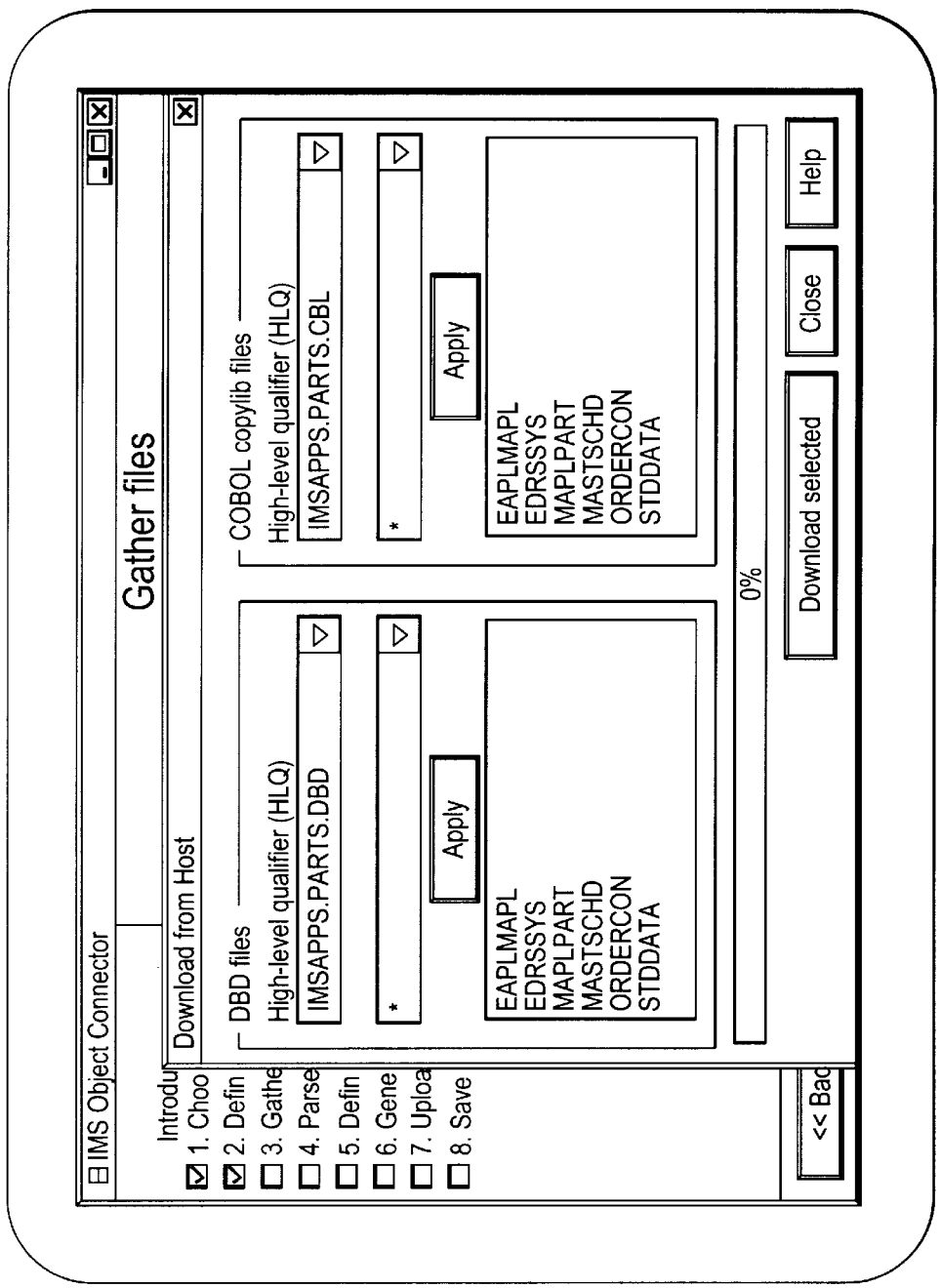

After entering the host, userid, and password data in the three fields indicated in FIG. 7E, and selecting the Logon button, the Download from Host page of FIG. 7F is displayed on the monitor of the client computer 100. This page is used by the user to identify and select the DBD files and COBOL copylib files on the server 102 to be downloaded, stored, and used by the CDT 400.

The page includes two groups of three list boxes, wherein one group comprises list boxes to specify a high-level qualifier and search mask for DBD files and list the resulting DBD files and the other group comprises list boxes to specify a high-level qualifier and search mask for COBOL copylib files and list the resulting COBOL copylib files. The page also includes five buttons, including the Apply (DBD files), Apply (COBOL copylib files), Download selected, Close, and Help buttons, which perform the following functions: (1) apply the specified high-level qualifier and search mask to a search for DBD files and list the resulting DBD files; (2) apply the specified high-level qualifier and search mask to a search for COBOL copylib files and list the resulting COBOL copylib files; (3) download any selected files in the lists of DBD files and COBOL copylib files; (4) close the page; and (5) display "Help" information by selecting the Help button.

Figure 7G:
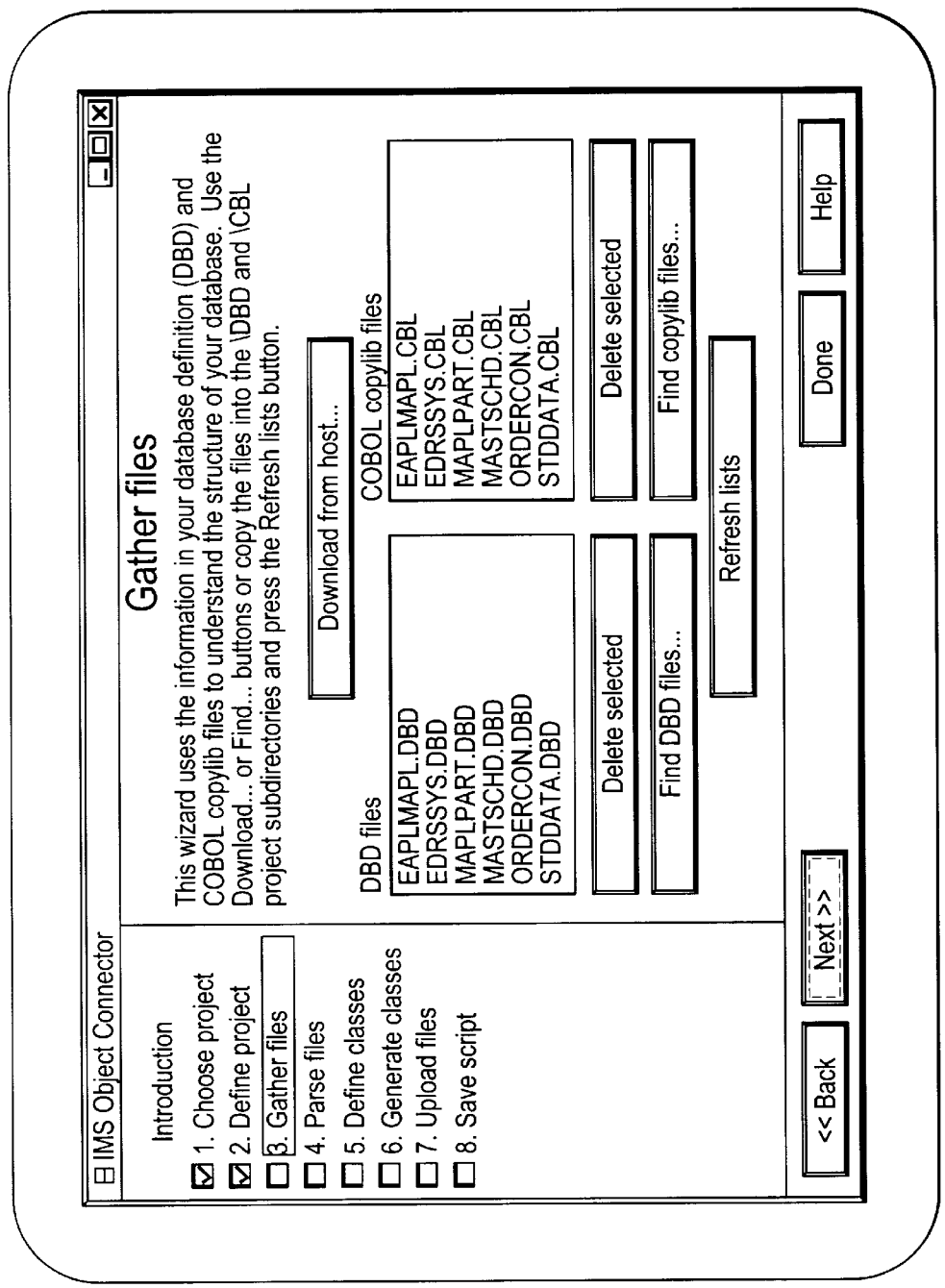

After selecting the Download selected button, the "Gather Files" page of FIG. 7G is displayed on the monitor of the client computer 100. After downloading any selected files in the lists of DBD files and COBOL copylib files from FIG. 7F, the list boxes in this page include the selected DBD files and COBOL copylib files stored in the catalog 404 that are to be used by the CDT 400.

As indicated above, the page includes ten buttons, including the Download from host, Deleted selected (DBD files), Find DBD files, Delete selected (COBOL Copylib files), Find copylib files, Refresh lists, Back, Next, Done, and Help buttons, which perform the following functions: (1) download files from the server 102 into the catalog 404; (2) deleted the selected DBD files from the list above the button; (3) find DBD files; (4) delete selected COBOL Copylib files from the list above the button; (5) find copylib files; (6) refresh both the DBD file list and COBOL copylib file list; (7) return to the previous step by selecting the Back button; (8) proceed to the next step by selecting the Next button; (9) terminate the Wizard by selecting the Done button; and (10) display "Help" information by selecting the Help button.

Figure 7H:
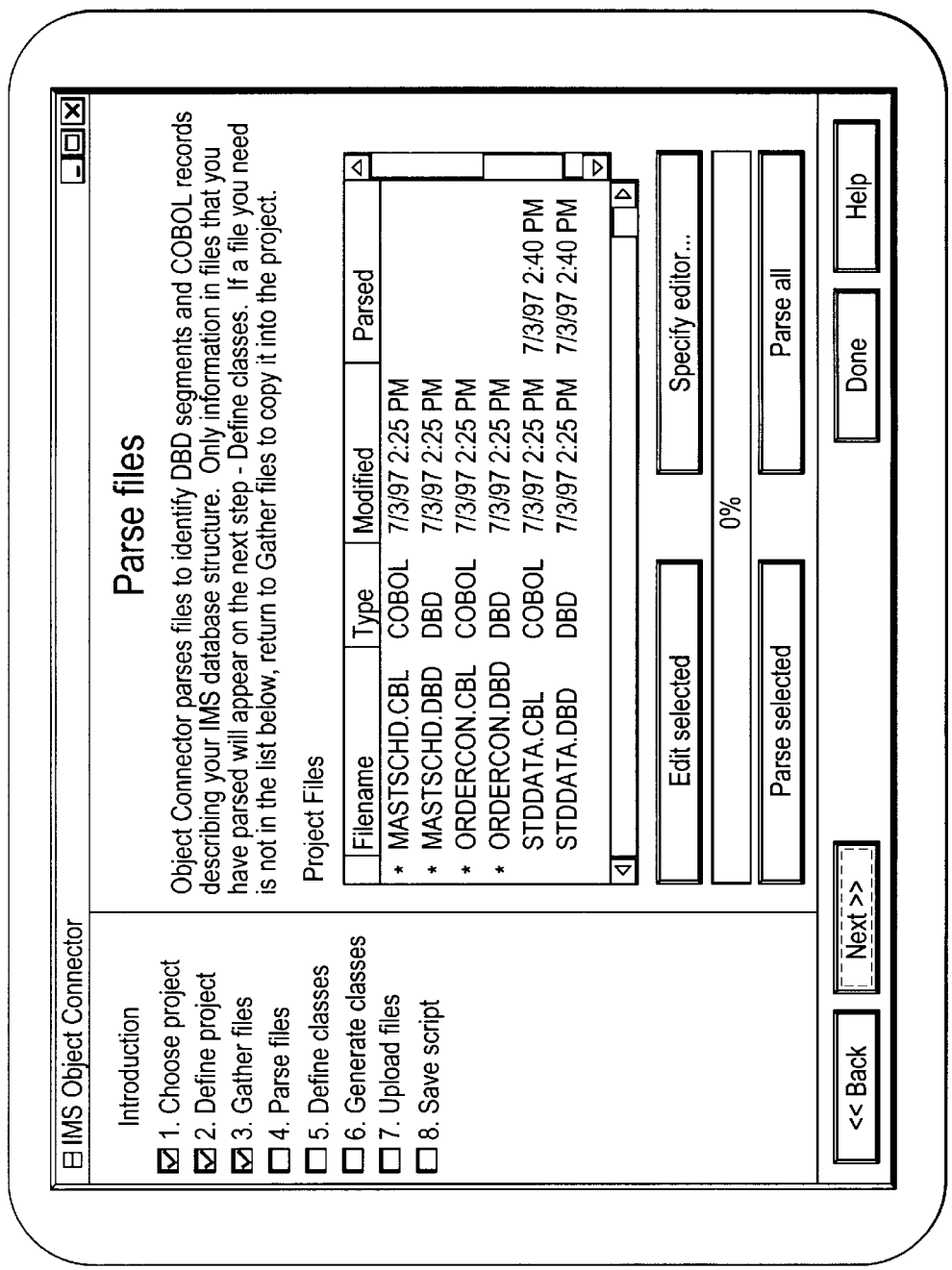
Figure 71:
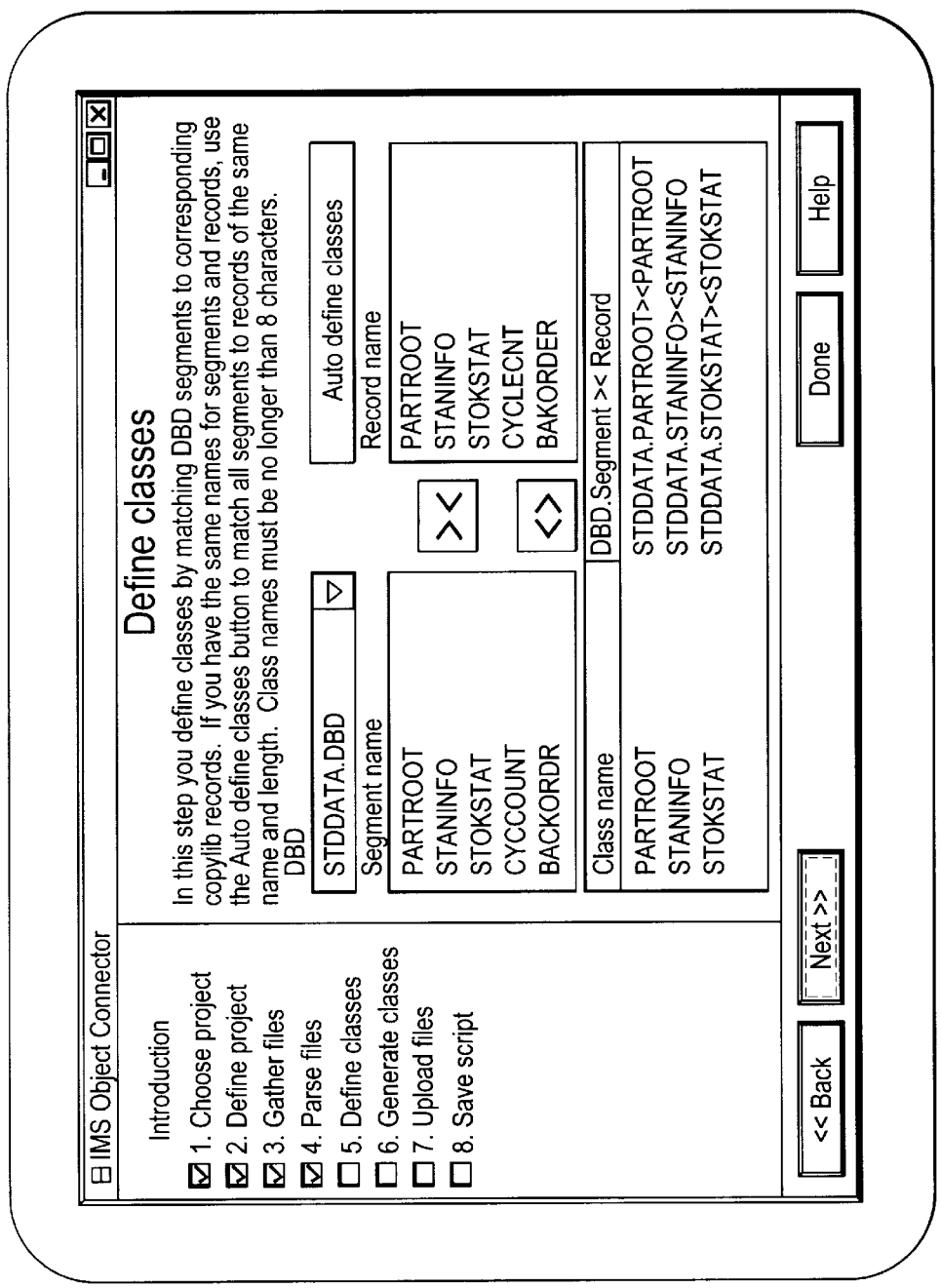

After selecting the Next button, the "Parse files" page of FIG. 7H is displayed on the monitor of the client computer 100. This page also provides the user interface for the database definer function 404 and is used by the user to specify the DBD files and COBOL copylib files from the Catalog 404 to be used by the CDT 400. The CDT 400 parses the selected files to identify DBD segments and COBOL records describing the structure of the IMS™ database 112. Only information in files that are parsed are defined as classes.

The page includes a list box of selected files and eight buttons, including the Edit selected, Specify editor, Parse selected, Parse all, Back, Next, Done, and Help buttons, which perform the following functions: (1) edit selected DBD files and COBOL copylib files; (2) specify the editor to use in step (1); (3) parse the selected files from the list box; (4) parse all of the files from the list box; (5) return to the previous step by selecting the Back button; (6) proceed to the next step by selecting the Next button; (7) terminate the Wizard by selecting the Done button; and (8) display "Help" information by selecting the Help button. The page also includes a "progress" bar above both parse buttons to indicate the progress being made by either of the parse functions.

After selecting the Next button, the "Define classes" page of FIG. 7I is displayed on the monitor of the client computer 100. This page provides the user interface for the class definer function 408 and is used by the user to define classes by matching segments from the DBD files to corresponding records from the COBOL copylib files. If the same names are used for the segments and records, an "auto-define" function can be used to perform the matching function.

The page includes a list box of selected DBD files, a list box of segment names, a list box of record names, and a list box of class names. The page also includes seven buttons, including the Auto define classes, >< (associate names), <> (disassociate names), Back, Next, Done, and Help buttons, which perform the following functions: (1) auto-define the classes; (2) associate the names between the segment name and record name list boxes; (3) disassociate the names between the segment name and record name list boxes; (4) return to the previous step by selecting the Back button; (5) proceed to the next step by selecting the Next button; (6) terminate the Wizard by selecting the Done button; and (7) display "Help" information by selecting the Help button.

Figure 7J:
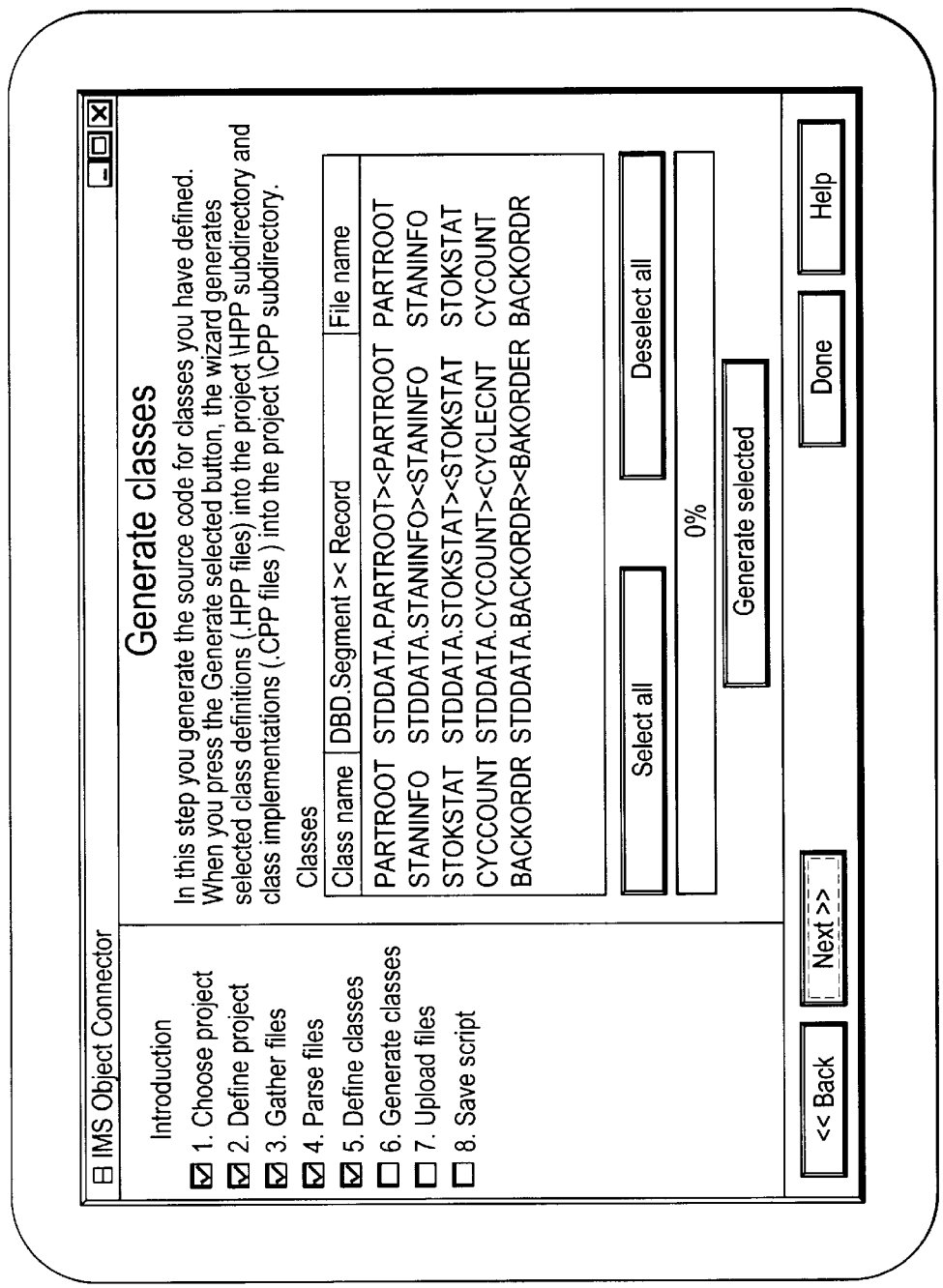

After selecting the Next button, the "Generate classes" page of FIG. 7J is displayed on the monitor of the client computer 100. This page provides the user interface for the class generator function 410 and web generator function 412, and is used to generate the source code for classes and web browser forms defined by matching segments from the DBD files to corresponding records from the COBOL copylib files. When the Generate button is selected, the Wizard 402 generates selected class definitions (.HPP files) into the "project\HPP" subdirectory, class implementations (.CPP files) into the "project\CPP" subdirectory, and web browser forms into the "project\FilesGen" subdirectory.

The page includes a list box of class names, related segment names and record names, file names for the generated source code. The page also includes seven buttons, including the Select all, Deselect all, Generate selected, Back, Next, Done, and Help buttons, which perform the following functions: (1) select all the classes in the list box; (2) deselect all the classes in the list box; (3) generate the class definitions and web browser forms for the selected classes; (4) return to the previous step by selecting the Back button; (5) proceed to the next step by selecting the Next button; (6) terminate the Wizard by selecting the Done button; and (7) display "Help" information by selecting the Help button. The page also includes a "progress" bar above the Generate selected button to indicate the progress being made in generating the class definitions and web browser forms for the selected classes.

Figure 7K:
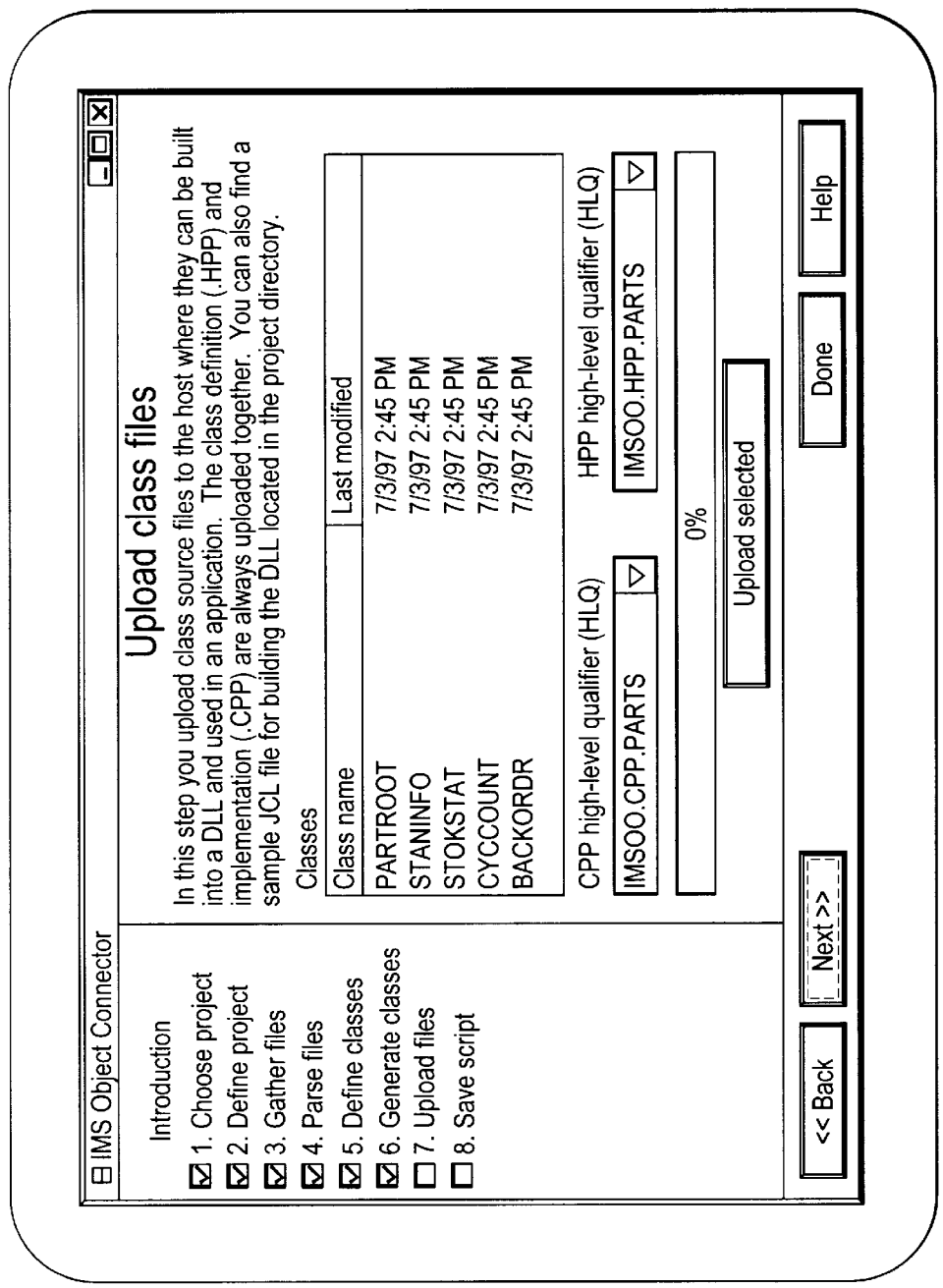

After selecting the Next button, the "Upload class files" page of FIG. 7K is displayed on the monitor of the client computer 100. This page is used to upload the source code for the class definitions and class implementations from the catalog 404 to the server 102, where they can be compiled into a runtime DLL that forms a part of the objects framework 108 for interfacing to the application program 106. (Note that web browser forms are not uploaded to the server 102; the forms are used for display on a client computer 102). Related class definitions and web browser forms (.HPP files) and class implementations (.CPP files) are uploaded together. Sample JCL (Job Control Language) for compiling the source code into the runtime DLL for the objects framework 108 is also located in the project directory.

The page includes a list box of file names for related class definitions (.HPP files) and class implementations (.CPP files), and list boxes for specifying a high-level qualifier for the .CPP files and for specifying a high-level qualifier for the .HPP files. The page also includes five buttons, including the Upload selected, Back, Next, Done, and Help buttons, which perform the following functions: (1) uploaded the class definitions (.HPP files) and class implementations (.CPP files) for the selected file name in the list box; (2) return to the previous step by selecting the Back button; (3) proceed to the next step by selecting the Next button; (4) terminate the Wizard by selecting the Done button; and (5) display "Help" information by selecting the Help button. The page also includes a "progress" bar above the Upload selected button to indicate the progress being made in uploading the class definitions (.HPP files) and class implementations (.CPP files) for the selected file name.

Figure 7L:
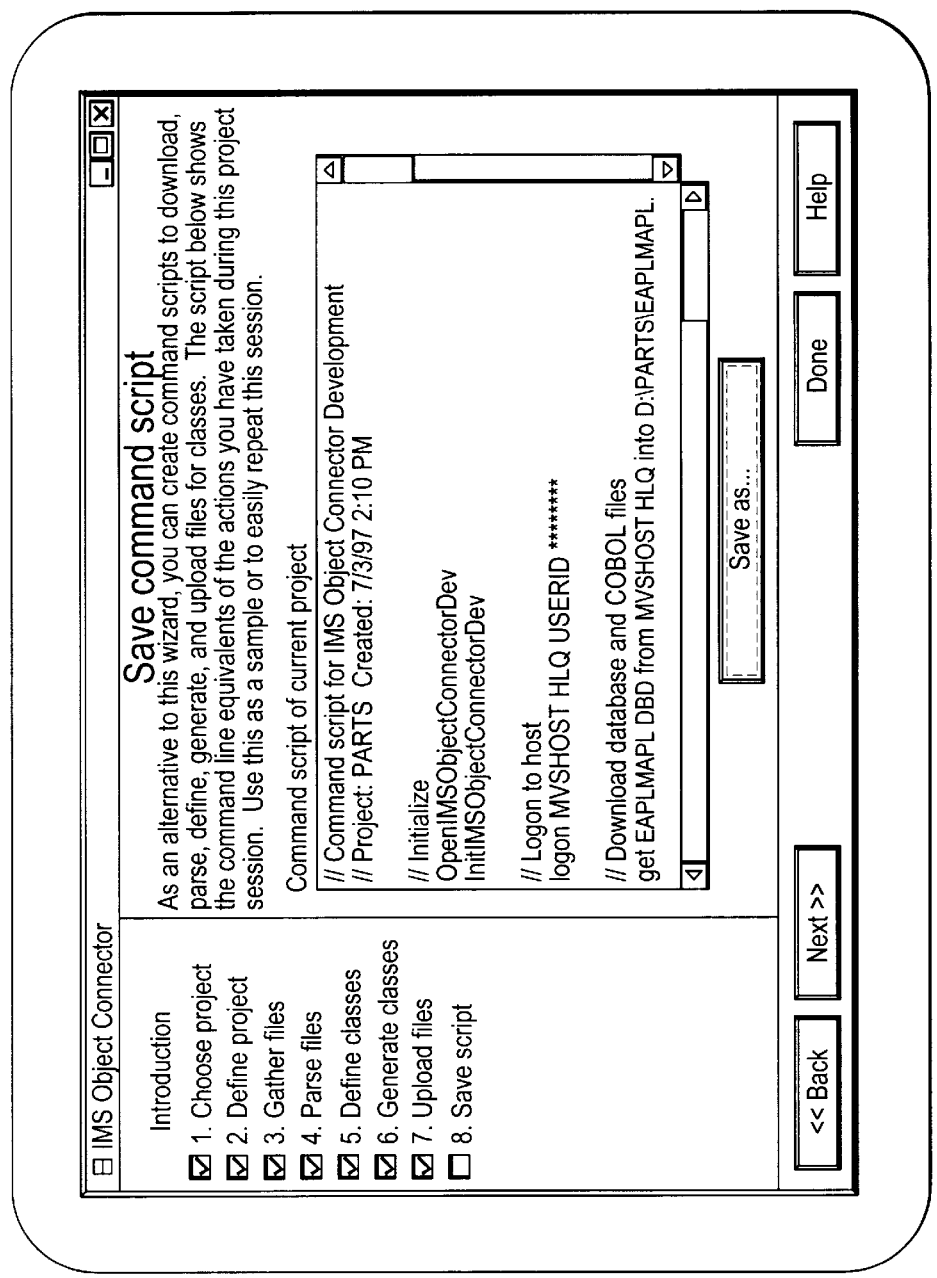

After selecting the Next button, the "Save command script" page of FIG. 7L is displayed on the monitor of the client computer 100. This page is used to create command scripts, as an alternative to using the IMS™ Object Connector Class Wizard 402, for performing the above downloading, parsing, defining, generating and uploading steps related to the construction of class definitions and implementations.

The page includes a text area showing the command script for the current project, wherein the text area includes vertical and horizontal scroll bars. The page also includes five buttons, including the Save as, Back, Next, Done, and Help buttons, which perform the following functions: (1) save the command script as a specified file; (2) return to the previous step by selecting the Back button; (3) proceed to the next step by selecting the Next button; (4) terminate the Wizard by selecting the Done button; and (5) display "Help" information by selecting the Help button.

Logic of the IMS™ Object Connector Class Wizard

Figure 8:
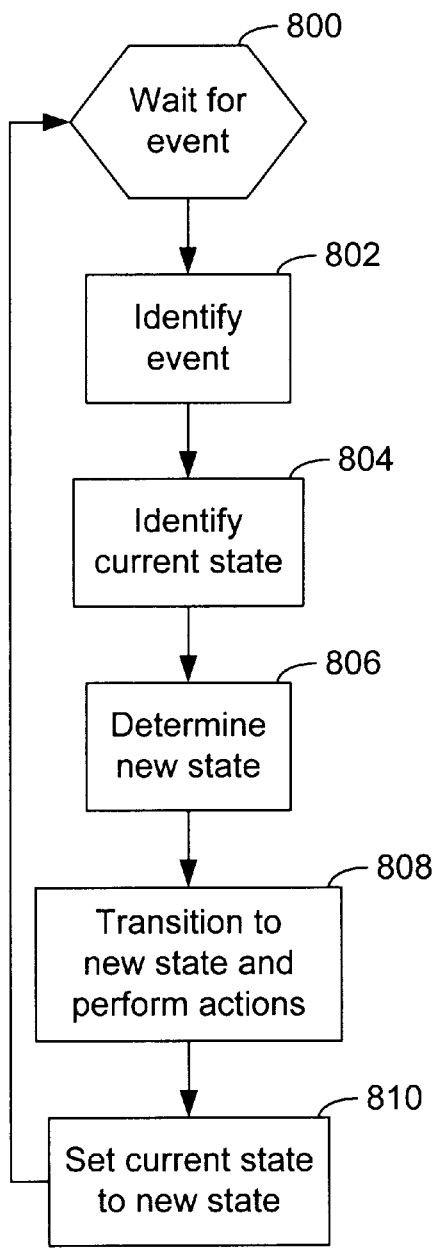
FIGS. 8 and 9 are flowcharts that illustrate the logic of the IMS™ Object Connector Class Wizard according to the present invention.
Figure 9:
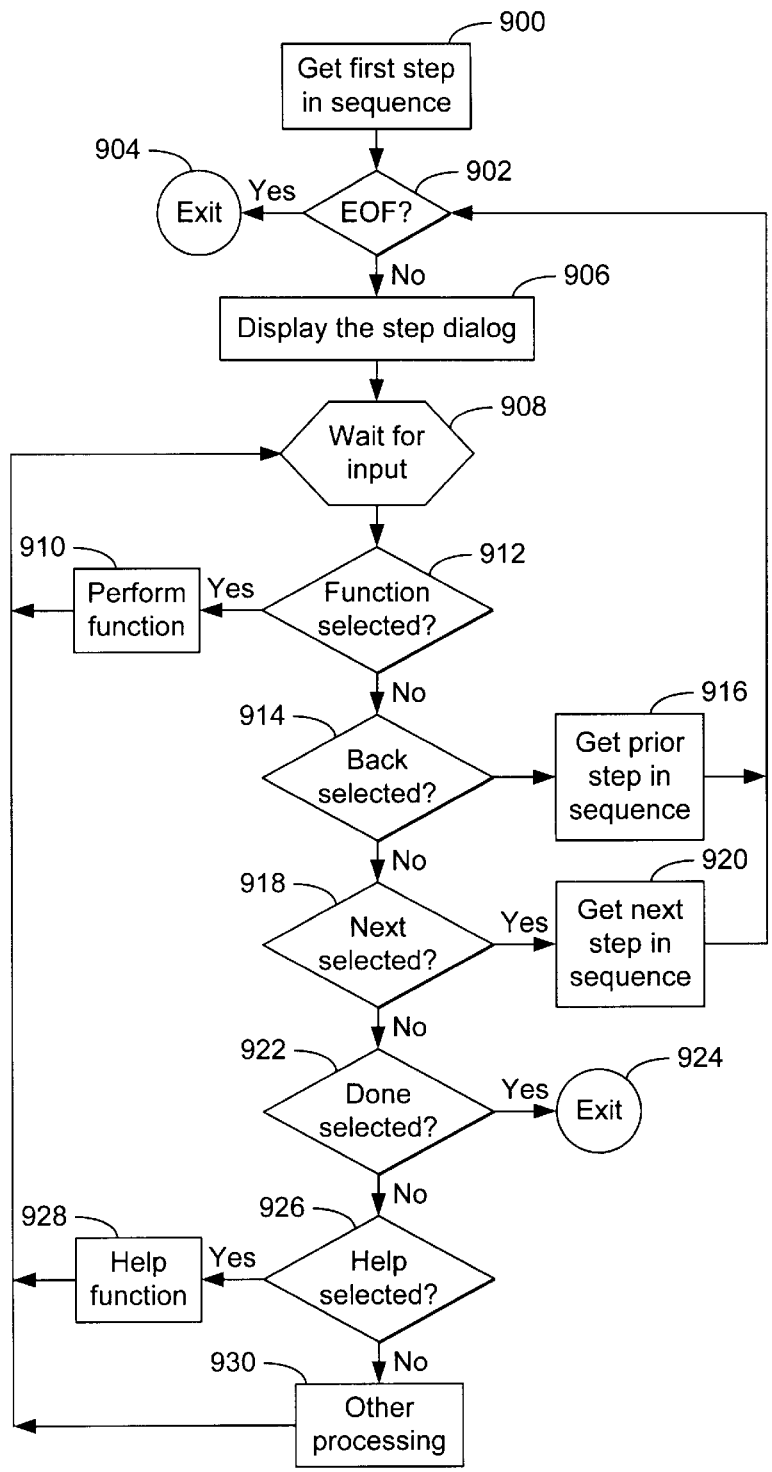

Flowcharts which illustrate the logic of the IMS™ Object Connector Class Wizard 402 of the present invention are shown in FIGS. 8 and 9. Those skilled in the art will recognize that this logic is provided for illustrative purposes only and that different logic may be used to accomplish the same results.

In the preferred embodiment, the various operations described below are specifically related to the IMS™ Object Connector Class Wizard 402 of the CDT 400. Of course, those skilled in the art will recognize that other functions could be used in the IMS™ Object Connector Class Wizard 402 without departing from the scope of the present invention.

FIG. 8 is a flowchart that illustrates the general logic of a message or event-driven CDT 400 performing the steps of the present invention. In such a CDT 400, operations are performed when transitions are made, based upon the receipt of messages or events, from present or current states to new states.

Generally, the flowchart begins by waiting at block 800 for an event (e.g., a mouse button click). It should be appreciated that during this time, other tasks, e.g., by the operating system or other computer programs, may also be carried out. When an event occurs, control passes to block 802 to identify the event. Based upon the event, as well as the current state of the system determined in block 804, a new state is determined in block 806. In block 808, the logic transitions to the new state and performs any actions required for the transition. In block 810, the current state is set to the previously determined new state, and control returns to block 800 to wait for more input events.

The specific operations that are performed by block 808 when transitioning between states will vary depending upon the current state and the event. The various operations required to implement and maintain the IMS™ Object Connector Class Wizard 402 of the present invention represent particular events handled by the logic. However, it should be appreciated that these operations represent merely a subset of all of the events handled by the computer 100.

FIG. 9 is a flowchart that illustrates the general logic to perform a sequence of steps for the IMS™ Object Connector Class Wizard 402. The logic begins at block 900 when control transfers from FIG. 8 after the IMS™ Object Connector Class Wizard 402 is invoked or selected by the user. Block 900 represents the computer 100 retrieving the first step in the sequence of pages (e.g., FIG. 7A) associated with the IMS™ Object Connector Class Wizard 402. Block 902 is a decision block that represents the computer 100 determining whether there are no more steps in the sequence associated with the IMS™ Object Connector Class Wizard 402. If so, control transfers to Block 904 to terminate the logic of the IMS™ Object Connector Class Wizard 402; otherwise, control transfers to Block 906.

Block 906 represents the computer 100 displaying the step page on the monitor. Block 908 represents the computer 100 waiting for user input (e.g., a mouse button click signifying selection of a function). Thereafter, control passes to blocks 910–930 to identify the input and perform associated functions.

Block 910 is a decision block that represents the computer 100 determining whether the user input is a function selected from the step page. If so, control transfers to Block 912; otherwise, control transfers to Block 914. Block 912 represents the computer 100 performing the selected function, e.g., any of the functions or group of functions described above in conjunction with FIGS. 7A–7K excluding the functions associated with the Back, Next, Done, and Help buttons. Thereafter, control transfers back to Block 908.

Block 914 is a decision block that represents the computer 100 determining whether the user input is a "Back" function selected from the page. If so, control transfers to Block 916; otherwise, control transfers to Block 918. Block 916 represents the computer 100 retrieving the prior step page in the sequence. Thereafter, control transfers back to Block 902.

Block 918 is a decision block that represents the computer 100 determining whether the user input is a "Next" function selected from the page. If so, control transfers to Block 920; otherwise, control transfers to Block 922. Block 920 represents the computer 100 retrieving the next step page in the sequence. Thereafter, control transfers back to Block 902.

Block 922 is a decision block that represents the computer 100 determining whether the user input is a "Done" function selected from the page. If so, control transfers to Block 924; otherwise, control transfers to Block 926. Block 924 represents the computer 100 terminating the logic of the IMS™ Object Connector Class Wizard 402.

Block 926 is a decision block that represents the computer 100 determining whether the user input is a "Help" function selected from the page. If so, control transfers to Block 928; otherwise, control transfers to Block 930. Block 928 represents the computer 100 performing the Help function. Thereafter, control transfers back to Block 908.

Block 930 represents the computer 100 performing other processing for other user input. Thereafter, control transfers back to Block 908.

Conclusion

This concludes the description of the preferred embodiment of the invention. The following paragraphs describe some alternative methods of accomplishing the same objects.

In alternative embodiments of the present invention, other types and configurations of computers could be used. For example, the invention need not be restricted to client-server configurations. In addition, mainframes, minicomputers, or personal computers, could be used with the present invention.

In alternative embodiments of the present invention, other types and configurations of computer programs could be used. For example, the invention need not be restricted to client-server configurations.

In alternative embodiments of the present invention, other database management systems could be used. For example, the invention need not be restricted to IMS™ database management systems. Instead, the present invention could be used to model other types of databases and datastores.

In summary, the present invention discloses a method, apparatus, and article of manufacture for accessing a hierarchical database. An objects framework models the database as one or more objects. An Internet-enabled generic application program accesses the database via the objects framework.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computerized method for generating an application for accessing a hierarchical database, comprising the steps of:
  (a) capturing a database description associated with the hierarchical database;
  (b) capturing a record layout associated with the hierarchical database;
  (c) associating the database description with the record layout to define a specification for the database;
  (d) generating one or more class definitions from the database specification, wherein the class definitions are instantiated as objects in an objects framework that encapsulate data retrieved from the database, wherein the objects framework provides a layered processing model that corresponds to application views, database definitions, and data defined and stored in the hierarchical database; and
  (e) generating one or more display forms from the database specification, wherein the display forms are used to display the data encapsulated by the instantiated objects in the objects framework.

2. The method of claim 1, wherein the display forms are HyperText Markup Language display forms.

3. The method of claim 1, wherein the display forms are selected from a group comprising input forms and output forms.

4. The method of claim 3, wherein the input forms include a hidden target data object class name.

5. The method of claim 4, further comprising the step of retrieving an object using the class name.

6. The method of claim 3, wherein the input forms include one or more retrieval contexts.

7. The method of claim 6, further comprising the step of retrieving an object using a qualified search when the retrieval contexts are specified in the input form.

8. The method of claim 6, wherein the retrieval contexts comprise key names for higher level segments in a hierarchical search path.

9. The method of claim 6, further comprising the step of retrieving an object using a non-qualified search when the retrieval contexts are not specified in the input form.

10. The method of claim 3, wherein the input forms include one or more attributes for the target data object.

11. The method of claim 3, wherein the input forms include one or more attributes for the target data object.

12. The method of claim 3, further comprising the step of dynamically building the output form from a skeleton output form combined with one or more attributes from the target data object.

13. The method of claim 3, further comprising the step of generating an output form containing fields associated with a specific data object.

14. The method of claim 1, further comprising the step of storing the database specification in a catalog.

15. The method of claim 1, wherein the objects framework comprises a C++ class library that interfaces to the application program.

16. A computerized apparatus for generating an application for accessing a hierarchical database, comprising:
  (a) a computer;
  (b) means, performed by the computer, for capturing a database description associated with the hierarchical database;
  (c) means, performed by the computer, for capturing a record layout associated with the hierarchical database;
  (d) means, performed by the computer, for associating the database description with the record layout to define a specification for the database;
  (e) means, performed by the computer, for generating one or more class definitions from the database specification, wherein the class definitions are instantiated as objects in an objects framework that encapsulate data retrieved from the database, wherein the objects framework provides a layered processing model that corresponds to application views, database definitions, and data defined and stored in the hierarchical database; and
  (f) means, performed by the computer, for generating one or more display forms from the database specification, wherein the display forms are used to display the data encapsulated by the instantiated objects in the objects framework.

17. The apparatus of claim 16, wherein the display forms are HyperText Markup Language display forms.

18. The apparatus of claim 16, wherein the display forms are selected from a group comprising input forms and output forms.

19. The method of claim 18, wherein the input forms include a hidden target data object class name.

20. The apparatus of claim 19, further comprising means for retrieving an object using the class name.

21. The apparatus of claim 18, wherein the input forms include one or more retrieval contexts.

22. The apparatus of claim 21, further comprising means for retrieving an object using a qualified search when the retrieval contexts are specified in the input form.

23. The apparatus of claim 21, wherein the retrieval contexts comprise key names for higher level segments in a hierarchical search path.

24. The apparatus of claim 21, further comprising means for retrieving an object using a non-qualified search when the retrieval contexts are not specified in the input form.

25. The apparatus of claim 18, wherein the input forms include one or more attributes for the target data object.

26. The apparatus of claim 18, wherein the input forms include one or more attributes for the target data object.

27. The apparatus of claim 18, further comprising means for dynamically building the output form from a skeleton output form combined with one or more attributes from the target data object.

28. The apparatus of claim 18, further comprising means for generating an output form containing fields associated with a specific data object.

29. The apparatus of claim 16, further comprising means for storing the database specification in a catalog.

30. The apparatus of claim 16, wherein the objects framework comprises a C++ class library that interfaces to the application program.

31. An article of manufacture comprising a computer program carrier embodying one or more instructions that, when executed by a computer, causes the computer to perform method steps for generating an application for accessing a hierarchical database, the method comprising the steps of:
  (a) capturing a database description associated with the hierarchical database;
  (b) capturing a record layout associated with the hierarchical database;
  (c) associating the database description with the record layout to define a specification for the database;
  (d) generating one or more class definitions from the database specification, wherein the class definitions are instantiated as objects in an objects framework that encapsulate data retrieved from the database, wherein the objects framework provides a layered processing model that corresponds to application views, database definitions, and data defined and stored in the hierarchical database; and
  (e) generating one or more display forms from the database specification, wherein the display forms are used to display the data encapsulated by the instantiated objects in the objects framework.

32. The method of claim 31, wherein the display forms are HyperText Markup Language display forms.

33. The method of claim 31, wherein the display forms are selected from a group comprising input forms and output forms.

34. The method of claim 33, wherein the input forms include a hidden target data object class name.

35. The method of claim 34, further comprising the step of retrieving an object using the class name.

36. The method of claim 33, wherein the input forms include one or more retrieval contexts.

37. The method of claim 36, further comprising the step of retrieving an object using a qualified search when the retrieval contexts are specified in the input form.

38. The method of claim 36, wherein the retrieval contexts comprise key names for higher level segments in a hierarchical search path.

39. The method of claim 36, further comprising the step of retrieving an object using a non-qualified search when the retrieval contexts are not specified in the input form.

40. The method of claim 33, wherein the input forms include one or more attributes for the target data object.

41. The method of claim 33, wherein the input forms include one or more attributes for the target data object.

42. The method of claim 33, further comprising the step of dynamically building the output form from a skeleton output form combined with one or more attributes from the target data object.

43. The method of claim 33, further comprising the step of generating an output form containing fields associated with a specific data object.

44. The method of claim 31, further comprising the step of storing the database specification in a catalog.

45. The method of claim 31, wherein the objects framework comprises a C++ class library that interfaces to the application program.

* * * * *